US008553261B2

(12) United States Patent
Okada

(10) Patent No.: US 8,553,261 B2
(45) Date of Patent: Oct. 8, 2013

(54) IMAGE COMMUNICATION APPARATUS

(75) Inventor: Mikiya Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 591 days.

(21) Appl. No.: 12/829,418

(22) Filed: Jul. 2, 2010

(65) Prior Publication Data

US 2011/0002007 A1 Jan. 6, 2011

(30) Foreign Application Priority Data

Jul. 6, 2009 (JP) .................................. 2009-159893

(51) Int. Cl.
*G06F 3/12* (2006.01)
*G06K 15/00* (2006.01)

(52) U.S. Cl.
USPC ........ 358/1.15; 358/1.13; 358/1.16; 370/389; 370/432

(58) Field of Classification Search
None
See application file for complete search history.

(56) References Cited

U.S. PATENT DOCUMENTS

| | | | |
|---|---|---|---|
| 6,947,182 B1 | 9/2005 | Kumagai | |
| 7,623,214 B2 | 11/2009 | Coles et al. | |
| 7,623,514 B2 | 11/2009 | Ozawa et al. | |
| 2006/0221957 A1* | 10/2006 | Ozawa et al. | 370/389 |
| 2009/0091776 A1* | 4/2009 | Kobayashi et al. | 358/1.13 |
| 2009/0135446 A1* | 5/2009 | Kawabuchi et al. | 358/1.15 |
| 2011/0134481 A1* | 6/2011 | Nagai et al. | 358/1.15 |

FOREIGN PATENT DOCUMENTS

| | | | |
|---|---|---|---|
| JP | 2001-103232 A | 4/2001 | |
| JP | 2005-184706 A | 7/2005 | |
| JP | 2006-287790 A | 10/2006 | |
| JP | 2006-293451 A | 10/2006 | |

\* cited by examiner

*Primary Examiner* — Satwant Singh
(74) *Attorney, Agent, or Firm* — Birch, Stewart, Kolasch & Birch, LLP

(57) ABSTRACT

An image communication apparatus includes: a display; an input device displaying an address input dialogue on the display, receiving a user input to designate an address of a transmission destination of multicast transmission; storage storing multicast transmission history; an extracting device, connected to the input device and the storage, responsive to the input device receiving an input of an address of a transmission destination of multicast transmission, for extracting, from the multicast transmission history, a multicast transmission history record including the address received by the input device as a transmission destination, and extracting an address different from the address received by the input device, included in the extracted multicast transmission history record, as a candidate of multicast transmission destination; and a control device controlling the display such that the extracted candidate of multicast transmission destination is displayed in the address input dialogue.

15 Claims, 19 Drawing Sheets

FIG. 4

| USER ID | MULTICAST TRANSMISSION DESTINATION LIST | | | | | | | DATE & TIME OF TRANSMISSION |
|---|---|---|---|---|---|---|---|---|
| ... | ... | ... | ... | ... | ... | ... | ... | ... |
| 0001 | yamada.saburou@sh.co.jp | aoki.ichirou@ab.co.jp | ... | suzuki.shirou@sh.co.jp | sato.gorou@sh.co.jp | ... | ... | 2009/6/16 10:32:15 |
| 0002 | | aoki.ichirou@ab.co.jp | ... | suzuki.shirou@sh.co.jp | | ... | ... | 2009/6/16 13:32:15 |
| 0005 | | aoki.ichirou@ab.co.jp | ... | | | tanaka.roku@sh.co.jp | tani.nana@xy.co.jp | 2009/6/17 09:15:28 |
| 0003 | yamada.saburou@sh.co.jp | aoki.ichirou@ab.co.jp | ... | | sato.gorou@sh.co.jp | | ... | 2009/6/17 15:59:22 |
| 0001 | yamada.saburou@sh.co.jp | aoki.ichirou@ab.co.jp | ... | suzuki.shirou@sh.co.jp | | | ... | 2009/6/17 18:41:11 |
| 0003 | yamada.saburou@sh.co.jp | | ... | suzuki.shirou@sh.co.jp | | tanaka.roku@sh.co.jp | ... | 2009/6/17 19:00:15 |
| 0001 | yamada.saburou@sh.co.jp | aoki.ichirou@ab.co.jp | ... | | sato.gorou@sh.co.jp | | ... | 2009/6/18 08:22:07 |
| 0001 | yamada.saburou@sh.co.jp | aoki.ichirou@ab.co.jp | ... | suzuki.shirou@sh.co.jp | | | ... | 2009/6/19 10:55:21 |
| 0004 | | | ... | | sato.gorou@sh.co.jp | tanaka.roku@sh.co.jp | | 2009/6/19 16:47:16 |
| 0001 | | aoki.ichirou@ab.co.jp | ... | | | tanaka.roku@sh.co.jp | ... | 2009/6/22 08:55:25 |
| ... | | | ... | | | | | ... |

FIG. 5

| REGISTERED ID | REGISTERED NAME | ADDRESS |
|---|---|---|
| 001 | AB CORP. AOKI ICHIROU | aoki.ichirou@ab.co.jp |
| 002 | CD CORP. AKAI JIROU | akai.jirou@cd.co.jp |
| 003 | EF CORP. ISHIDA ICHIROU | ishida.ichirou@ef.co.jp |
| 004 | GH CORP. ISHIKAWA JIROU | ishikawa.jirou@gh.co.jp |
| 005 | IJ CORP. UEDA ICHIROU | ueda.ichirou@ij.co.jp |
| 006 | KI CORP. UCHIDA JIROU | uchida.jirou@kl.co.jp |
| 007 | MN CORP. EDO ICHIROU | edo.ichirou@mn.co.jp |
| 008 | OP CORP. ENDOH JIROU | endoh.jirou@op.co.jp |
| 009 | QR CORP. OGAWA ICHIROU | ogawa.ichirou@qr.co.jp |
| 010 | ST CORP. OOSAKA JIROU | osaka.jirou@st.co.jp |
| ⋮ | ⋮ | ⋮ |
| 095 | SH CORP. SATO GOROU | sato.gorou@sh.co.jp |
| ⋮ | ⋮ | ⋮ |
| 105 | SH CORP. SUZUKI SHIROU | suzuki.shirou@sh.co.jp |
| ⋮ | ⋮ | ⋮ |
| 140 | SH CORP. TANAKA ROKUROU | tanaka.roku@sh.co.jp |
| ⋮ | ⋮ | ⋮ |
| 174 | SH CORP. YAMADA SABUROU | yamada.saburou@sh.co.jp |
| ⋮ | ⋮ | ⋮ |

FIG. 17

| GROUP ID | USER ID | MULTICAST TRANSMISSION DESTINATION LIST | | | | | | DATE & TIME OF TRANSMISSION |
|---|---|---|---|---|---|---|---|---|
| ... | ... | ... | ... | ... | ... | ... | ... | ... |
| 01 | 0001 | yamada.saburou@sh.co.jp | aoki.ichirou@ab.co.jp | suzuki.shirou@sh.co.jp | sato.gorou@sh.co.jp | | | 2009/6/16 10:32:15 |
| 02 | 0002 | | aoki.ichirou@ab.co.jp | suzuki.shirou@sh.co.jp | | | | 2009/6/16 13:32:15 |
| 01 | 0005 | | aoki.ichirou@ab.co.jp | | | tanaka.roku@sh.co.jp | | 2009/6/17 09:15:28 |
| 03 | 0003 | yamada.saburou@sh.co.jp | aoki.ichirou@ab.co.jp | | sato.gorou@sh.co.jp | | tani.nana@xy.co.jp | 2009/6/17 15:59:22 |
| 01 | 0001 | yamada.saburou@sh.co.jp | aoki.ichirou@ab.co.jp | suzuki.shirou@sh.co.jp | | | | 2009/6/17 18:41:11 |
| 03 | 0003 | yamada.saburou@sh.co.jp | | suzuki.shirou@sh.co.jp | | tanaka.roku@sh.co.jp | | 2009/6/17 19:00:15 |
| 01 | 0001 | yamada.saburou@sh.co.jp | aoki.ichirou@ab.co.jp | | sato.gorou@sh.co.jp | | | 2009/6/18 08:22:07 |
| 01 | 0001 | yamada.saburou@sh.co.jp | aoki.ichirou@ab.co.jp | suzuki.shirou@sh.co.jp | | | | 2009/6/19 10:55:21 |
| 02 | 0004 | | | | sato.gorou@sh.co.jp | tanaka.roku@sh.co.jp | | 2009/6/19 16:47:16 |
| 01 | 0001 | | aoki.ichirou@ab.co.jp | | | tanaka.roku@sh.co.jp | | 2009/6/22 08:55:25 |
| ... | ... | ... | ... | ... | ... | ... | ... | ... |

IMAGE COMMUNICATION APPARATUS

CROSS-REFERENCE TO RELATED APPLICATION

This nonprovisional application claims priority under 35 U.S.C. §119(a) on Patent Application No. 2009-159893 filed in Japan on Jul. 6, 2009, the entire contents of which are hereby incorporated by reference.

BACKGROUND OF THE INVENTION

1. Field of the Invention

The present invention relates to an image communication apparatus represented by a facsimile apparatus and having multicast transmission (multi-address transmission) function of transmitting image data to a plurality of designated transmission destinations in response to one transmission request and, more specifically, to an image communication apparatus capable of easily and highly flexibly designating destinations of multicast transmission. The present invention also relates to an image forming apparatus including such an image communication apparatus.

2. Description of the Background Art

It has become increasingly common to connect an image forming apparatus having a printer function or a copy function to a network, to allow use by a plurality of users. Further, the number of apparatuses having a plurality of functions (modes) such as a copy function, an image communication function (typically a facsimile function; hereinafter "facsimile" may also be denoted as FAX or fax), a network-supported printer function and a scanner function, such as multi-function peripherals (MFP) as one type of image forming apparatuses, is increasing. The image communication function includes the facsimile function of transmitting/receiving image data using public line, an Internet facsimile function of transmitting/receiving image data using Internet connection, and an electronic mail transmitting function of transmitting/receiving image data as an attachment to an electronic mail.

In the image communication function as such, in order to simplify user's operation and to prevent misdirection, it is a common practice to register a destination name and a destination number (FAX number, mail address) as a speed dial or an abbreviated dial, and to designate a destination using the speed dial or the abbreviated dial at the time of transmission.

Further, it is also common to transmit the same document to a plurality of constant destinations such as branches of a company, related departments or customers. In order to ease the trouble of such an operation, the image transmitting function often includes a so-called multicast transmission function. The multicast transmission refers to transmission of the same image data to a plurality of input destinations. When using the multicast transmission, it is necessary to confirm that there is no input omission. Therefore, it is necessary to compare the destinations of past multicast transmission history and the actually input destinations. It is troublesome to examine the plurality of destinations each time.

Japanese Patent Laying-Open No. 2005-184706 (hereinafter referred to as "'706 Reference") discloses a communication apparatus as a solution to such a problem. The communication apparatus having the multicast transmission function disclosed in '706 Reference includes an input receiving unit for receiving inputs of a plurality of destinations of multicast transmission, storage for storing history records of multicast transmission, and an alarm unit, responsive to a transmission start instruction, when the input receiving unit receives input of a plurality of destinations, giving an alarm if a history record of multicast transmission having all the input destinations and any other destination as the destinations is stored in the storage unit, to urge the user to confirm whether there is any input omission.

According to the communication apparatus, at the time of multicast transmission, it is possible to prevent omission without the necessity of checking the destinations input by the user.

SUMMARY OF THE INVENTION

In the communication apparatus disclosed in '706 Reference, however, checking of any input omission of multicast destinations is not possible until a transmission start instruction is issued. If any omission of destinations is found in the communication apparatus, it is necessary for the user to return to the image for designating destinations of multicast transmission, and to add the missed destination. In order to solve such a problem, a communication function that allows the user to more efficiently confirm whether or not there is any input omission in the multicast destinations has been desired.

In order to solve such a problem, an image communication apparatus having the multicast transmission function, capable of giving useful information to the user in an easy-to-recognize manner, enabling the user to designate destinations of multicast transmission without any input omission, and thereby preventing omission of destination of multicast transmission, is desirable.

According to a first aspect, the present invention provides an image communication apparatus capable of multicast transmission of transmitting image data to a plurality of transmission destinations in response to one transmission request. The image communication apparatus includes: a display device; an input device displaying an address input dialogue on the display device, for receiving a user input to designate an address of a transmission destination of multicast transmission; and first storage storing multicast transmission history records. Each of the multicast transmission history records includes an address of a destination of multicast transmission. The image communication apparatus further includes: an extracting device, connected to the input device and the first storage, responsive to the input device receiving an input of an address of a transmission destination of multicast transmission, for extracting, from the multicast transmission history stored in the first storage, a multicast transmission history record including the address received by the input device as a transmission destination, and extracting an address different from the address received by the input device, included in the extracted multicast transmission history record, as a candidate of multicast transmission destination; and a control device controlling the display device such that the extracted candidate of multicast transmission destination is displayed in the address input dialogue.

By the image communication apparatus, while destinations of multicast transmission are being designated, an address that has been multicast in the past in combination with any designated destination of multicast transmission is displayed as a candidate of multicast transmission destination. While the user is designating destinations of multicast transmission, he/she is reminded of an address that has been multicast in combination with the destinations. Therefore, useful information to enable the user to easily set the destinations of multicast transmission without any omission can be given to the user.

Preferably, the first storage stores, user group by user group, multicast transmission history records by a user belonging to the corresponding user group. The image communication apparatus further includes a user identifying device for identifying a user operating the input device. The extracting device includes a device, connected to the input device and the first storage, responsive to the input device receiving an input of an address of a transmission destination of multicast transmission, for extracting, using the multicast transmission history stored in the first storage, a multicast transmission history record including the address received by the input device as a transmission destination, from the history of multicast transmissions by a user of the user group to which the user identified by the user identifying device belongs, and a device extracting an address different from the address received by the input device, included in the multicast transmission history record extracted by the device for extracting, as a candidate of multicast transmission destination.

By the image communication apparatus, while a user is designating destinations of multicast transmission, an address that has been designated in the past as a destination of multicast transmission in combination with any designated destination of multicast transmission by another user belonging to the same group of the user is displayed. The user who is designating destinations of multicast transmission is reminded of the address he/she once designated as the destination of multicast transmission in combination with the destinations as well as an address that has been designated as the destination of multicast transmission in combination with the destinations by other user belonging to the same group as the user. As a result, an address that is highly possibly a destination to be designated of the multicast transmission is displayed, and hence, destinations of multicast transmission can be set easily without omission.

The group may consist of a single user.

More preferably, the input device is capable of receiving a plurality of address inputs. The extracting device includes a device, connected to the input device and the first storage, responsive to the input device receiving an input of an address of a transmission destination of multicast transmission, for extracting, from the multicast transmission history stored in the first storage, a multicast transmission history record including all addresses received by the input device as transmission destinations, and extracting an address different from the address received by the input device, included in the extracted multicast transmission history record, as a candidate of multicast transmission destination.

Multicast transmission history record including all addresses received by the input device as the transmission destinations is extracted, and the address as a candidate of transmission destination is selected therefrom. Therefore, it becomes highly possible that an address to be selected as the multicast transmission destination is displayed. As a result, destinations of multicast transmission can be set easily without omission.

The image communication apparatus may further include address storage storing an address of a transmission destination.

The input device may include an address selecting device, responsive to a user instruction, for displaying a list of addresses stored in the address storage, and receiving an address selecting input by the user, and a candidate selecting device, receiving designation by the user in relation to any of the candidates of multicast transmission destination displayed by the control device, for outputting an address of the designated candidate of multicast transmission destination.

The list of addresses is displayed and any address can be selected therefrom as the multicast transmission destination. As a result, destinations of multicast transmission can be set easily without omission.

According to a second aspect, the present invention provides, in an image communication apparatus transmitting image data, a method of designating a transmission destination of multicast transmission of transmitting image data to a plurality of transmission destinations in response to one transmission request. The method includes the steps of: receiving a user input designating a transmission destination of multicast transmission; storing, in storage, a multicast transmission history of a group to which the user belongs; extracting, in response to the user input designating a transmission destination of multicast transmission, a multicast transmission history record including a transmission destination recorded as having been selected as a transmission destination simultaneously with the input transmission destination, from the history of multicast transmissions by a user of the user group to which the user belongs, to be a candidate of multicast transmission destination; and displaying the extracted candidate of multicast transmission destination on a display device.

According to a third aspect, the present invention provides an image forming apparatus including an image transmission function of transmitting image data. The image forming apparatus includes: image storage storing image data to be transmitted; a display device displaying information related to a transmission destination; an input device receiving a user input designating a multicast transmission destination as a transmission destination when image data is transmitted to a plurality of transmission destinations in response to one transmission request; storage storing a history of multicast transmission of a group to which the user belongs; an extracting device extracting, using the stored history of multicast transmission, a transmission destination having the history of multicast transmission in combination with the transmission destination input as the multicast transmission destination, by the group to which the user belongs, as a candidate of multicast transmission destination; a control device controlling the display device such that the extracted candidate of multicast transmission destination is displayed; and a transmission unit, responsive to a user instruction designating multicast transmission, for transmitting the image data stored in the image storage to the multicast transmission destinations designated by the input device.

According to a fourth aspect, the present invention provides a method of managing history of multicast transmission in an image forming apparatus. The method includes the steps of: storing history records of multicast transmission performed in the image forming apparatus; receiving history records of multicast transmission in another image forming apparatus, from another apparatus; and storing the history records of multicast transmission received at the receiving step, additionally in the storage. Each of the history records of multicast transmission includes a transmission destination address of multicast transmission.

By the image communication apparatus and the image forming apparatus including the communication apparatus, when the user designates destinations of multicast transmission, useful information allowing the user to designate multicast transmission destinations without omission is given to the user in an easily recognizable manner. Therefore, destinations of multicast transmission can be set easily, and omission of necessary destination can be prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a multicast transmission destination management table stored in the server computer and MFP of FIG. 1.

FIG. 5 shows a registered destination management table stored in the server computer and MFP of FIG. 1.

FIG. 17 shows a multicast transmission destination management table stored in the server computer and MFP of a network image forming system in accordance with a second embodiment of the present invention.

DESCRIPTION OF THE PREFERRED EMBODIMENTS

Figure 1:
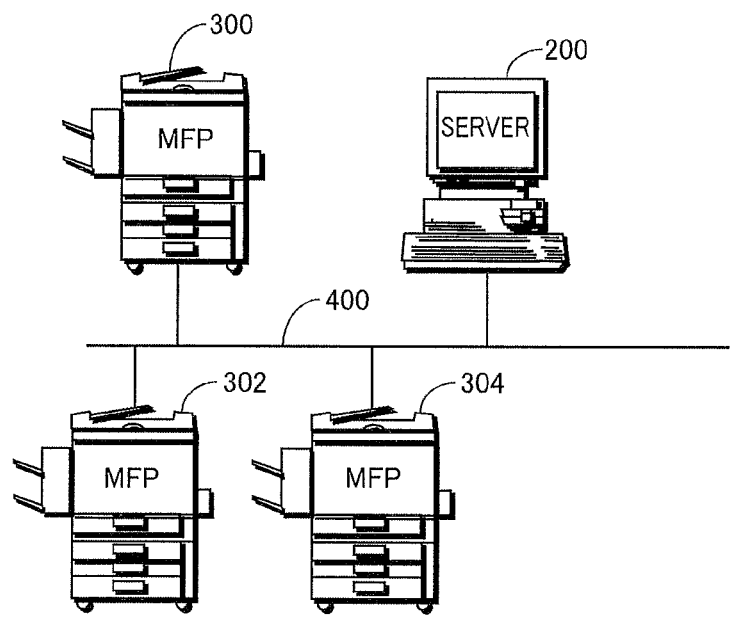
FIG. 1 shows an overall configuration of a network image forming system in accordance with a first embodiment of the present invention.

In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is applicable to any apparatus having at least the image communication function (facsimile transmission function, Internet facsimile function or electronic mail transmission function) and providing the multicast transmission function, and not limited to an MFP.

In the network image forming system described in the following, the server computer manages the history of multicast transmission in a plurality of MFPs, and MFPs provide useful information related to the destinations of multicast transmission. It is also possible not to provide a server computer, and the useful information related to the destinations of multicast transmission may be given by a single MFP, or the useful information related to the destinations of multicast transmission may be given through communication between each of the plurality of MFPs.

First Embodiment

Overall System Configuration

Referring to FIG. 1, an overall configuration of a network image forming system in accordance with the first embodiment of the present invention will be described. The network image forming system includes MFPs 300 to 304 multicasting image data upon reception of a multicast transmission request, and a server computer 200 receiving multicast transmission history records of users of MFPs 300 to 304 received from MFPs 300 to 304 and managing the history records. Server computer 200 and MFPs 300 to 304 are connected to be communicable with each other through a network line 400 in compliance with, for example, IEEE 802.3. It is noted that MFPs 300 to 304 do not necessarily have the same functions. In the following, description will be given with reference to MFP 300 as a representative of MFPs 300 to 304. It is naturally understood that the server computer executes the same process for each of the plurality of MFPs.

In the present embodiment, when multicast transmission ends, MFP 300 transmits a multicast transmission destination list including destinations of multicast transmission together with a user ID uniquely identifying the user who carried out the multicast transmission, through network line 400 to server computer 200. Server computer 200 stores the received multicast transmission destination list of the user as well as the user ID uniquely identifying the user, in a multicast transmission destination management table. Server computer 200 transmits, at a constant time interval, difference data of user-by-user multicast transmission destination list, together with the user ID, to MFP 300, based on user-by-user multicast transmission destination management table. When destinations of multicast transmission are designated by the user, MFP 300 displays any destination having a history that it has been multicast by the user together with the destinations currently being designated, on the touch-panel display along with the image for designating a destination.

In this manner, according to the present embodiment, a destination designated by the logged-in user to use the MFP and a destination or destinations that were multicast in the past with the destination are displayed on the touch-panel display. Therefore, it is possible for the user to designate the next destination of multicast transmission while looking at the display.

In the following description and in the figures, server computer 200 may be simply referred to as a server, and MFPs 300 to 304 may be simply referred to as an MFP.

[Hardware Configuration]

<Server Computer 200>

Figure 2:
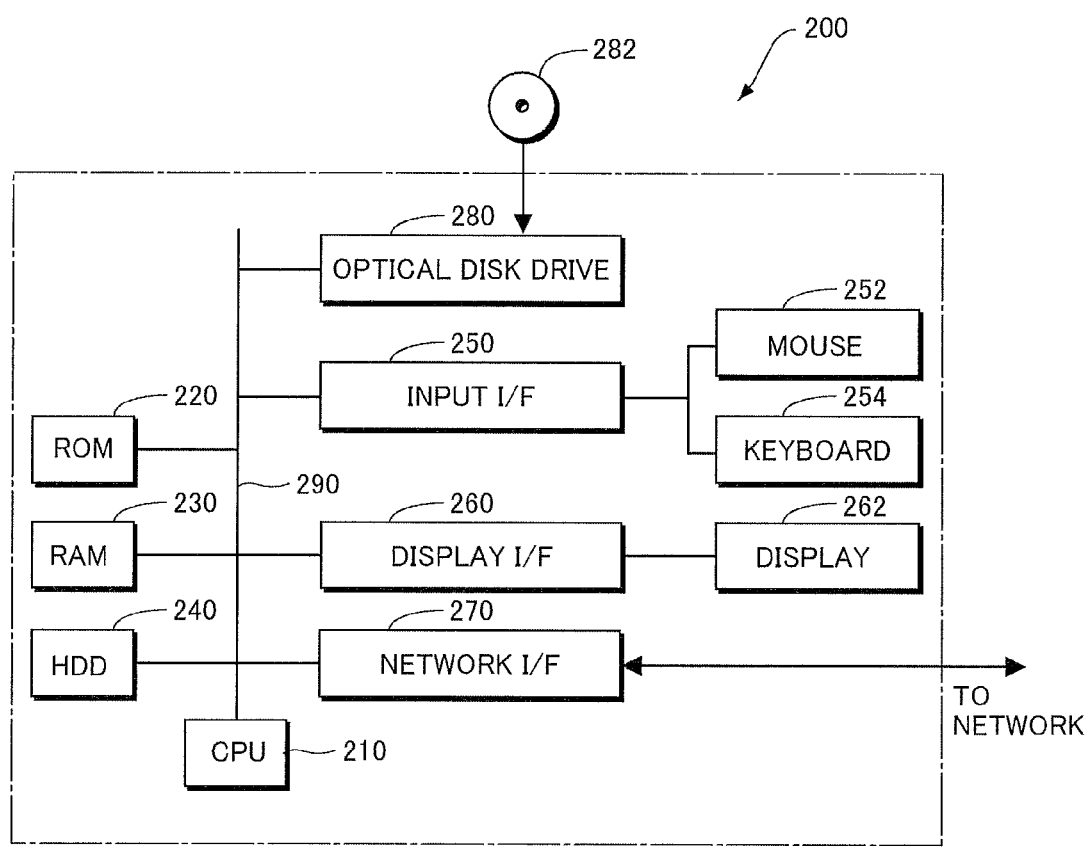
FIG. 2 is a control block diagram showing hardware configuration of the server computer shown in FIG. 1.

Referring to FIG. 2, server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk drive (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400. Server computer 200 may include a magnetic disk drive on which a magnetic disk is mountable, and capable of writing of information to the magnetic disk and reading of information from the magnetic disk, in place of or in addition to optical disk drive 280.

Bus 290, ROM 220, RAM 230, HDD 240, optical disk drive 280, input I/F 250, display I/F 260 and network I/F 270 all operate in cooperation with each other under the control of CPU 210, and as the server computer in accordance with the present invention, server computer 200 realizes processes of various applications. By way of example, such applications realize a server computer in the network image forming system, which receives the multicast transmission destination list from each MFP, maintains multicast transmission destination management table for collective management of destinations to which multicast transmission has been made by MFPs 300, and transmits the same to MFPs 300.

The computer program or programs causing server computer 200 to operate as the server computer of the network image forming system in accordance with the present embodiment are stored in optical disk 282 to be inserted to optical disk drive 280, and transferred to HDD 240. Alternatively, the programs may be transmitted through network line 400 to server computer 200 and stored in HDD 240. At the time of execution, the programs are loaded to RAM 230. The programs may be directly loaded to RAM 230 from optical disk 282 or through network line 400.

These programs include a plurality of instructions causing server computer 200 to operate as the server computer in the network image forming system in accordance with the present embodiment. Some of the basic functions necessary to realize these operations are provided by an operating system (OS) operating on server computer 200 or a third-party program, or a program module of various software tool kits installed in server computer 200. Therefore, the program may not necessarily include all functions required to realize the method and system in accordance with the present embodiment. The program may include only the instructions executing a prescribed process as server computer 200 described above, by calling appropriate functions or "software tools" in a controlled manner to attain the desired results. General operations of a computer as the substance of server computer 200 are well known and, therefore, description will not be given here.

<MFP 300>

Figure 3:
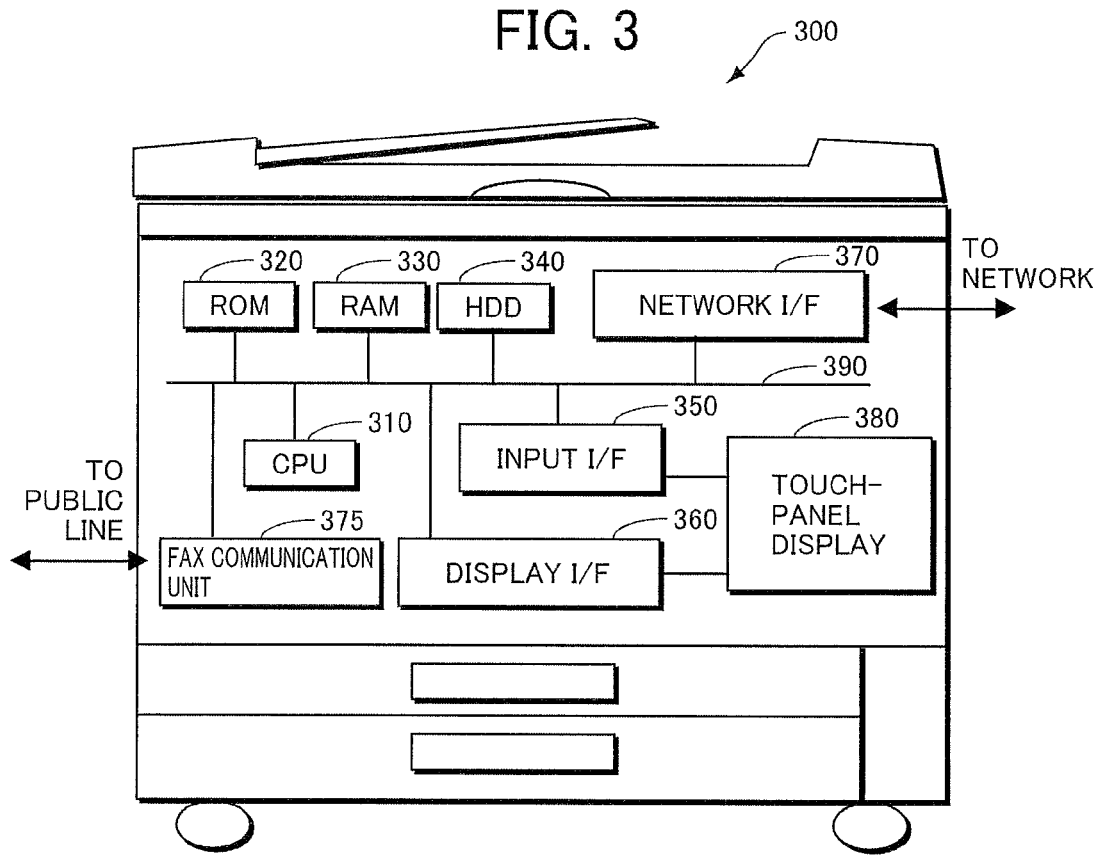
FIG. 3 is a control block diagram showing hardware configuration of the MFP shown in FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; an HDD 340 connected to bus 390; an input I/F 350 and a display I/F 360, connected to bus 390, for providing interface related to connection with touch-panel display 380; a network I/F 370 providing wired or wireless (in the present embodiment, wired) connection to network line 400; and a FAX communication unit 375 providing connection to public line. Though not shown in FIG. 3, MFP 300 includes hardware buttons such as a start button and ten-key buttons. Further, MFP 300 has a function of allowing a user to log-in, to use MFP 300. By way of example, it includes an input unit receiving an input of a user number (such as a company member number) as a user ID, and a determining unit determining whether the input number is a user number registered in advance. The input unit may be a fingerprint input unit (an input unit scanning one's fingerprint by an optical mechanism) and the determining unit may be a fingerprint recognizing unit. Any biometric information other than the fingerprint may be used.

Bus 390, ROM 320, RAM 330, HDD 340, input I/F 350, display I/F 360, network I/F 370 and FAX communication unit 375 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

The image communication function of MFP 300 includes the facsimile communication function of transmitting/receiving image data using public line through FAX communication unit 375, the Internet facsimile transmission function of transmitting/receiving image data using the Internet connection through network I/F 370, and the electronic mail transmission function of transmitting/receiving image data attached to an electronic mail. Further, MFP 300 has the multicast transmission mode in which the same image data is transmitted to a plurality of destinations by a series of transmission processes, when the image transmission function is selected.

MFP 300 includes, for example, a document reading unit, an image forming unit, a paper feed unit, and a paper discharge unit. In MFP 300, on image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function.

In the following, the facsimile communication operation in the facsimile mode (also referred to as a facsimile/image transmission mode) will be described. In the facsimile mode, a document reading unit (scanner unit) and FAX communication unit 375 mainly operate for the transmitting operation and FAX communication unit 375 and an image forming unit mainly operate for the receiving operation, whereby the facsimile communication operation is realized. The operations in the Internet facsimile function and the electronic mail transmission function are substantially similar, though the destination is not a FAX number but a computer address or a mail address.

Transmission Operation

In MFP 300, when the facsimile mode is designated, a document placed on a platen is read by a document reading unit as image data, the read image data is input to CPU 310, the image data is subjected various image processing operations, and the resulting image data is output to FAX communication unit 375.

FAX communication unit 375 on the transmitting side MFP 300 connects a designated transmitting side line to a designated transmission destination, converts the image data to communication data in accordance with facsimile transmission standard, and transmits the same to a receiving side facsimile apparatus (for example, an MFP 300 having the facsimile communication function).

Communication Operation

When the line is connected, FAX communication unit 375 of the receiving side MFP 300 detects a communication request signal from FAX communication unit 375 of the transmitting side MFP 300, and transmits an acknowledgement signal. Thereafter, FAX communication units 375 pass performance information provided in the transmitting side and the receiving side, respectively, determine the highest possible communication speed available, and coding/code correction method of image data, and set modem communication method. Using image signal format in accordance with the determined communication method, data is transmitted from FAX communication unit 375 of the transmitting side MFP 300 to FAX communication unit 375 of the receiving side MFP 300. When transmission ends, the line is disconnected.

Receiving Operation

FAX communication unit 375 on the receiving side MFP 300 converts the received data to image data, and transmits the same to an image forming unit. The received data may be converted by the image forming unit. The image forming unit prints the document image represented by the image data converted from the received data on a sheet of recording paper, as in the image forming operation in a copy mode, as will be described below.

In the following, the image forming operation in the copy mode will be described. The image forming unit is for printing an image represented by the image data on a sheet of recording paper, and it includes, by way of example, a photoreceptor drum, a charger, a laser scanning unit, a developer, a transfer device, a cleaning device, a fixing device and a neutralizer. In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray.

[Configuration of Management Table]

Referring to FIG. 4, the multicast transmission destination management table stored in HDD 240 of server computer 200 and in HDD 340 of MFP 300 will be described. The multicast transmission destination management table stores, based on the multicast transmission destination list transmitted from MFP 300, multicast transmission history indicating what destinations are combined and multicast by the user of the MFP 300. In the following, the image communication function will be described as the electronic mail transmission function. In the facsimile transmission function, a mail address will be changed to a telephone number used for FAX.

As shown in FIG. 4, each record in the multicast transmission destination management table consists of a field for string a user ID for uniquely identifying a user, a field for storing a list of multicast transmission (multicast transmission destination list), and a field for storing date and time of transmission. Though the number of fields of multicast transmission list is 6 (six) in FIG. 4, it is not limiting. In the example of FIG. 4, user-by-user lists of multicast transmission destination records are stored in time-sequential order. The multicast transmission destination lists may be stored in a different order, or the multicast transmission destination lists may be stored in accordance with a predetermined priority. In addition to the fields mentioned above, the list may additionally include a field for storing a machine ID for uniquely identifying an MFP 300.

As shown in FIG. 4, the user having the user ID of "0001" performed multicast transmission on "2009/06/16 10:32:15" to "yamada.saburo@sh.co.jp", "aoki.ichirou@ab.co.jp", "suzuki.shirou@sh.co.jp" and "sato.gorou@sh.co.jp" (destinations: Yamada, Aoki, Suzuki, Sato); on "2009/06/17 18:41:11" to "yamada.saburo@sh.co.jp", "aoki.ichirou@ab.co.jp" and "suzuki.shirou@sh.co.jp" (destinations: Yamada, Aoki, Suzuki); on "2009/06/18 08:22:07" to "yamada.saburo@sh.co.jp", "aoki.ichirou@ab.co.jp" and "sato.gorou@sh.co.jp" (destinations: Yamada, Aoki, Sato); on "2009/06/19 10:55:21" to "yamada.saburo@sh.co.jp", "aoki.ichirou@ab.co.jp" and "suzuki.shirou@sh.co.jp" (destinations: Yamada, Aoki, Suzuki); and on "2009/06/22 08:55:25" to "aoki.ichirou@ab.co.jp" and "tanaka.roku@sh.co.jp" (destinations: Aoki, Tanaka).

Here, using Aoki as a key (designating as the first destination of multicast transmission as will be described later) for the user having the user ID of "0001", it can be seen that four destinations, i.e. Yamada, Suzuki, Sato and Tanaka have been selected as destinations of multicast transmission with Aoki. More specifically, Yamada has been selected four times, Suzuki three times, Sato two times and Tanaka once, as the destinations of multicast transmission with Aoki. In time sequential order, Tanaka is the newest (6/22) followed by Yamada and Suzuki (6/19) and Sato (6/18).

The database shown in FIG. 4 is an example and the present invention is not limited to such a database.

Referring to FIG. 5, a registered destination management table stored in HDD 240 of server computer 200 and in HDD 340 of MFP 300 will be described. The registered destination management table may be stored only in MFP 300.

As shown in FIG. 5, each record in the registered destination management table includes a field for storing a registered ID, a field for storing a name (registered name) registered corresponding to the registered ID, and a field for storing an address.

The record of the registered destination management table may further include a field for storing a destination group ID, a speed dial number, or an abbreviated number.

[Software Configuration]

Figure 6:
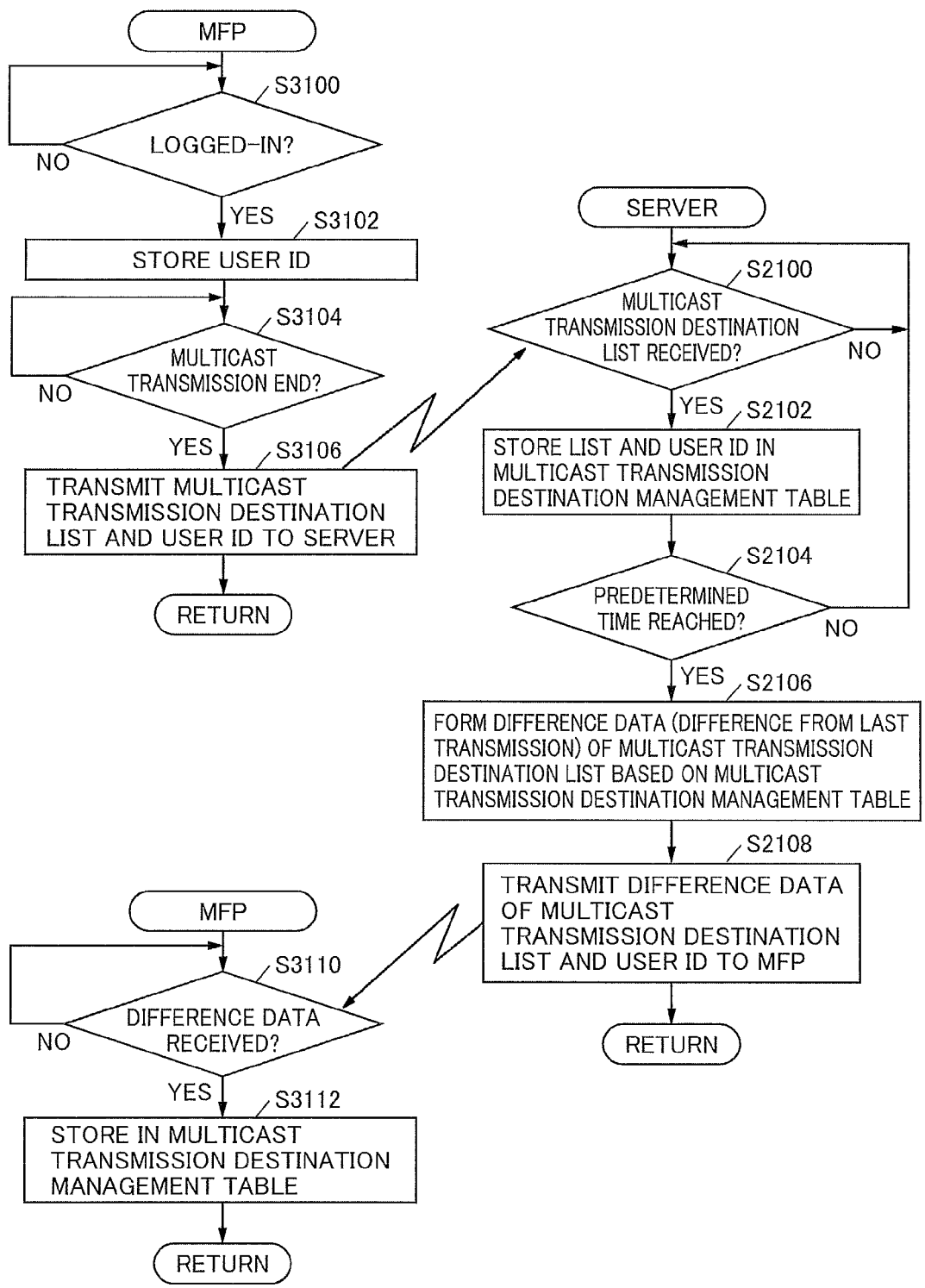
FIG. 6 is a flowchart representing a control structure of a multicast transmission history processing program executed by the server computer and MFP of FIG. 1, respectively.

Referring to FIG. 6, a control structure of a computer program executed by server computer 200 and MFP 300 for implementing the process of giving useful information related to destinations of multicast transmission to a user designating destinations of multicast transmission in MFP 300 of the network image forming system in accordance with the present embodiment will be described.

The program shown on the upper left side of FIG. 6 is executed by CPU 310 of MFP 300. At step (hereinafter, "step" will be denoted by "S") 3100, CPU 310 of MFP 300 (hereinafter simply referred to as CPU 310) determines whether or not a user of MFP 300 has requested log-in and successfully logged-in. At this time, CPU 310 displays a user number input dialogue or a fingerprint input dialogue on touch-panel display 380. If a user number is input or a fingerprint of the user is input, CPU 310 determines whether or not the user who requested log-in is a registered user, based on the input user number or the user's fingerprint. If the result of determination is positive, the user is permitted to log-in, and the control proceeds to S3102. Otherwise (NO at S3100), the process returns to S3100.

At S3102, CPU 310 stores a user ID for uniquely identifying a user, registered in correspondence with the input user number or the fingerprint of the user.

At S3104, CPU 310 determines whether or not multicast transmission process has been executed and finished in MFP 300. If it is determined that the multicast transmission process in MFP 300 has been finished (YES at S3104), the process proceeds to S3106. Otherwise (NO at S3104), the process returns to S3104.

At S3106, CPU 310 transmits a list of multicast transmission destinations of the finished multicast transmission as the multicast transmission destination list, to server computer 200, together with the user ID stored at S3102. At this time, the date and time of multicast transmission are also transmitted to sever computer 200.

The program shown on the right side of FIG. 6 is executed by CPU 210 of server computer 200. At S2100, CPU 210 of server computer 200 waits until the multicast transmission destination list is received from MFP 300.

At S2102, CPU 210 stores the multicast transmission destination list received from MFP 300 in multicast transmission destination management table shown in FIG. 4, together with the received user ID. As the multicast transmission destination lists are received from MFPs 300 and stored in the multicast transmission destination management table, a large number of multicast transmission destination lists come to be stored together with user IDs in the multicast transmission destination management table. Here, in order to avoid excessive storage of data of multicast transmission management table, the data whose date and time of transmission are older than six month, for example, may be deleted.

At S2104, CPU 210 determines whether or not a predetermined time is reached. The predetermined time is determined corresponding to a time interval for maintenance of the multicast transmission destination management table. If it is determined that the predetermined time (for example, a time corresponding to the time interval of 12 hours) is reached (YES at S2104), the control proceeds to S2106. Otherwise (NO at S2104), the control returns to S2100. Such a process is done since a multicast transmission destination list of one MFP 300 may be reflected on a multicast transmission destination list of another MFP at some time interval. Depending on the number of MFPs connected to network line 400 and on the frequency of multicast transmission, the determination at S2104 may be omitted. In that case, the multicast transmission destination management table of each MFP is updated on real-time basis.

At S2106, CPU 210 forms difference data (multicast transmission destination list added from the last transmission) of the multicast transmission destination list, based on the multicast transmission destination list stored in the multicast transmission destination list management table. At S2108, CPU 210 transmits the difference data of multicast transmission destination list together with the user ID, to each MFP. As to the transmission of difference data of multicast transmission destination list to MFP, here, only the change made after the last transmission is transmitted in the form of difference data, to reduce communication traffic.

The program shown on the lower left side of FIG. 6 is executed by CPU 310 of MFP 300. At S3110, CPU 310 waits until the difference data of multicast transmission destination list (user-by-user multicast transmission destination list) and the user ID are received from server computer 200.

At S3112, CPU 310 updates the multicast transmission destination management table stored in HDD 340 of MFP 300, using the difference data of the user-by-user multicast transmission destination list received from server computer 200. As a result, in the network image forming system in accordance with the present embodiment, even if a user uses a different MFP for multicast transmission, it is possible to manage the multicast transmission history of each user in each MFP, regardless of which MFP is used.

Figure 7:
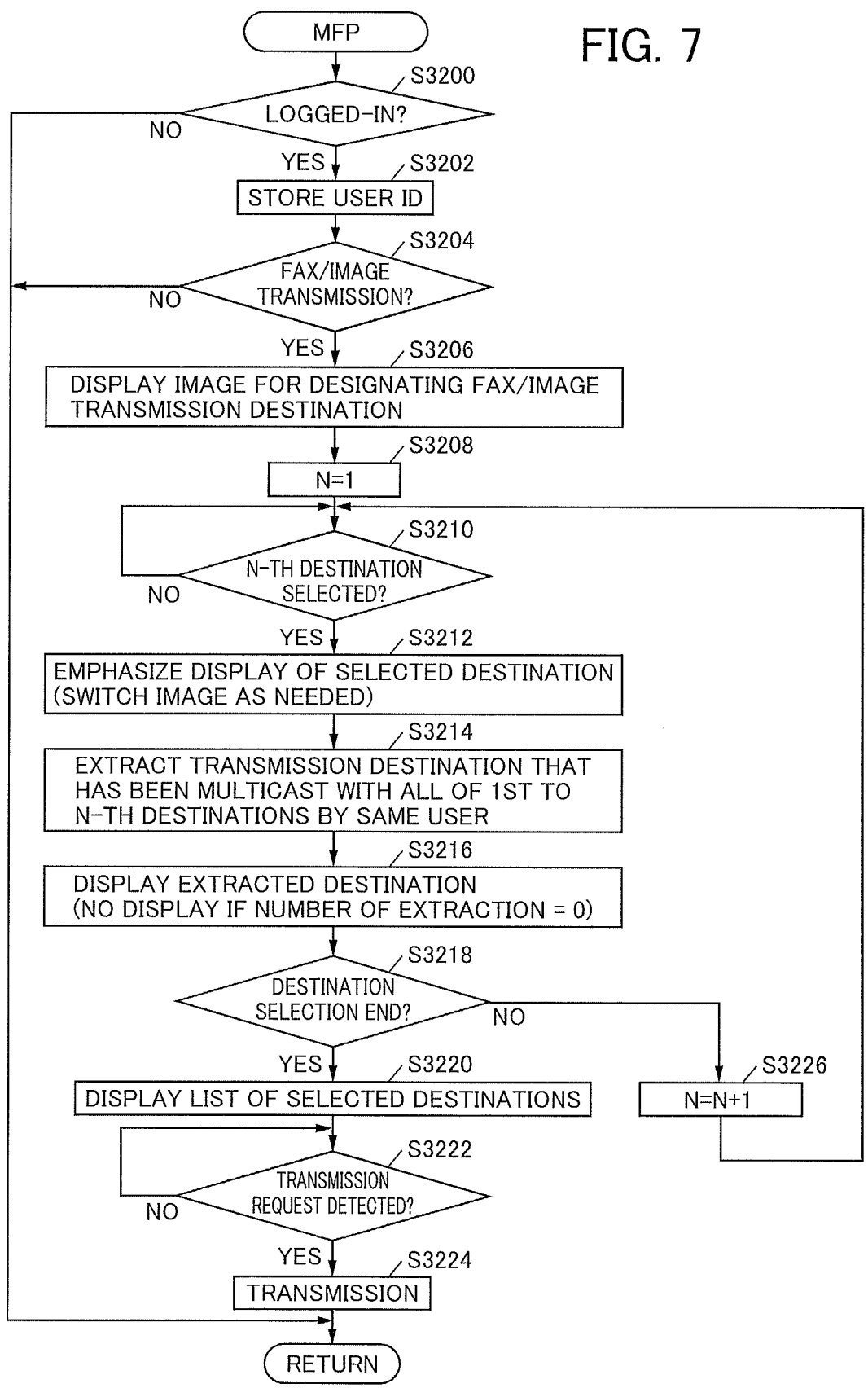
FIG. 7 is a flowchart representing a control structure of a multicast transmission destination designating program executed by the MFP of FIG. 1.

Referring to FIG. 7, a control structure of a computer program executed by MFP 300 when the user designates destinations of multicast transmission in the network image forming system in accordance with the present embodiment will be described. The program is activated when the user requests log-in. The log-in request is made when there is an input to a user number input dialog or a fingerprint input dialog displayed on the display.

At S3200, CPU 310 determines whether or not the user who requested log-in is a registered user. If the result of determination is positive, the user is permitted to log-in, and the control proceeds to S3202. If the determination at S3200 is negative, the process ends. Similar to the process of S3100 described above, the process may wait until it is determined that an authorized user has logged-in.

At S3202, CPU 310 stores a user ID registered in advance in correspondence with the input user number or the user fingerprint.

At S3204, CPU 310 determines whether or not the fax/image transmission mode is selected. This MFP 300 has three modes, that is, "copy mode", "fax/image transmission mode" and "document filing mode." It may further have a printer mode. By way of example, when any of software buttons corresponding to the three modes displayed at the top of touch-panel display 380 is pressed, CPU 310 determines that the user has made mode selection. If it is determined that the fax/image transmission mode is selected by the user (YES at S3204), the process proceeds to S3206. Otherwise (NO at S3204), the process ends.

At S3206, CPU 310 displays an image allowing designation of destinations of fax/image transmission on touch-panel display 380. At S3208, CPU 310 initializes a variable N indicating the number of destinations designated as destinations of multicast transmission (N=1). At S3210, CPU 310 determines whether or not the N-th destination of multicast transmission has been selected. If one destination is designated from two or more destinations registered in advance, "selection of a destination" means "designation of a destination." If the N-th destination of multicast transmission is selected (YES at S3210), the process proceeds to S3212. Otherwise (NO at S3210), the process returns to S3210 and waits until the N-th destination is input.

At S3212, CPU 310 emphasizes the selected destination by highlighting, flickering or the like on touch-panel display 380. If a large number of destinations are registered as shown in FIG. 5, it is impossible to display all destinations on one image of touch-panel display 380. Therefore, an address book of registered users is displayed switchable page by page on touch-panel display 380.

At S3214, CPU 310 extracts, using the multicast transmission destination management table (FIG. 4) stored in HDD 340, a transmission destination (destination) that is included in the record of multicast transmission designating all destinations from the first to N-th destinations made by the logged-in user and not yet designated in the present process. If N=1, a destination having the record of multicast transmission with the first destination in the history of multicast transmission is extracted.

At S3216, CPU 310 displays the extracted destination or destinations on touch-panel display 380. At this time, in the present embodiment, CPU 310 displays the extracted destinations side by side with the image for designating multicast transmission. If the number of extracted destinations is zero, nothing is displayed.

At S3218, CPU 310 determines whether or not the selection of multicast transmission destinations is complete. Specifically, if a "transmission destination designation end" or "transmission destination selection end" button on touch-panel display 380 is pressed, CPU 310 determines that selection of all destinations of multicast transmission has been complete. If it is determined that selection of all destinations of multicast transmission has been complete (YES at S3218), the control proceeds to S3220. Otherwise (NO at S3218), the control proceeds to S3226.

At S3220, CPU 310 displays a list of destinations selected as the multicast transmission destinations, on touch-panel display 380. At S3222, CPU 310 determines whether or not a transmission request is detected. At this time, if a "start button" provided as a hardware button is pressed, CPU 310 determines that the transmission request is detected. If it is determined that the transmission request is detected (YES at S3222), the process proceeds to S3224. Otherwise (NO at S3222), the process returns to S3222, and waits until the transmission request is detected. At S3224, CPU 310 executes the transmission process. Though not shown in the figure, a cancel key for stopping multicast transmission may be provided, and by detecting which key is pressed at S3218 or S3222, the control may be switched to an appropriate step. Further, a routine for deleting already designated destination or destinations may be added.

If the result of determination at S3218 is negative, at S3226, CPU 310 adds 1 to variable N, and the control returns to S3210.

[Operation]

The operation of network image forming system in accordance with the present embodiment based on the structures and flowcharts as above will be described in the following.

<Multicast Transmission History Processing Operation>

Referring to the multicast transmission destination management table shown in FIG. 4 and the flowchart shown in FIG. 6, the network image forming system operates in the following manner at the time of multicast transmission history processing.

First, the user requests log-in, by inputting a user number or by inputting the fingerprint of the user, on touch-panel display 380 of MFP 300 to be used. If the user who requested log-in is a user registered in advance to allow use of MFP 300, log-in is permitted (YES at S3100). The user ID is stored in MFP 300 (S3102), and the user can be uniquely identified.

If the user performs the fax/image transmission process by MFP 300 and the process ends (YES at S3104), the addresses selected by the user as the multicast transmission destinations in the MFP 300 are transmitted as a multicast transmission destination list, together with the user ID and the date and time of transmission, to server computer 200 (S3106).

In response to such an operation of MFP 300, server computer 200 receives the multicast transmission destination list, together with the user ID, from MFP 300 (YES at S2100). The received multicast transmission destination list is stored, with the user ID, in HDD 240 in the form of multicast transmission destination management table shown in FIG. 4 (S2102).

Until a predetermined time is reached, the process of transmitting user-by-user transmission destination lists collected in sever computer 200 to MFPs 300 does not take place (NO at S2104). If the predetermined time is reached (YES at S2104), based on the multicast transmission destination list stored in the multicast transmission destination management table, difference data (difference from the last transmission) of the multicast transmission destination list is formed (S2106). The difference data is transmitted to MFP 300 (S2108).

In response to such an operation of server computer 200, each of MFPs 300 to 304 (for example, MFP 300) receives the difference data of multicast transmission destination list with the user ID (YES at S3110). The received difference data of the user-by-user multicast transmission destination list is stored, added to the multicast transmission destination management table stored in HDD 340 (S3112).

In server computer 200, receiving the multicast transmission destination lists from MFPs 300 to 304, the multicast transmission destination management table (FIG. 4) is updated on real-time basis. Therefore, user history of multicast transmission destinations is accumulated in the multicast transmission destination management table. In this manner, the user history of multicast transmission are accumulated in the multicast transmission destination management table, while the difference data of multicast transmission destinations is transmitted to MFP 300 at a preset time interval. MFP 300 updates the multicast transmission destination management table stored in its HDD 340.

<Multicast Transmission Destination Setting Operation>

Referring to the flowchart shown in FIG. 7 and the image transitions on touch-panel display 380 shown in FIGS. 8 to 13, the multicast transmission destination setting operation of the network image forming system will be described.

Figure 8:
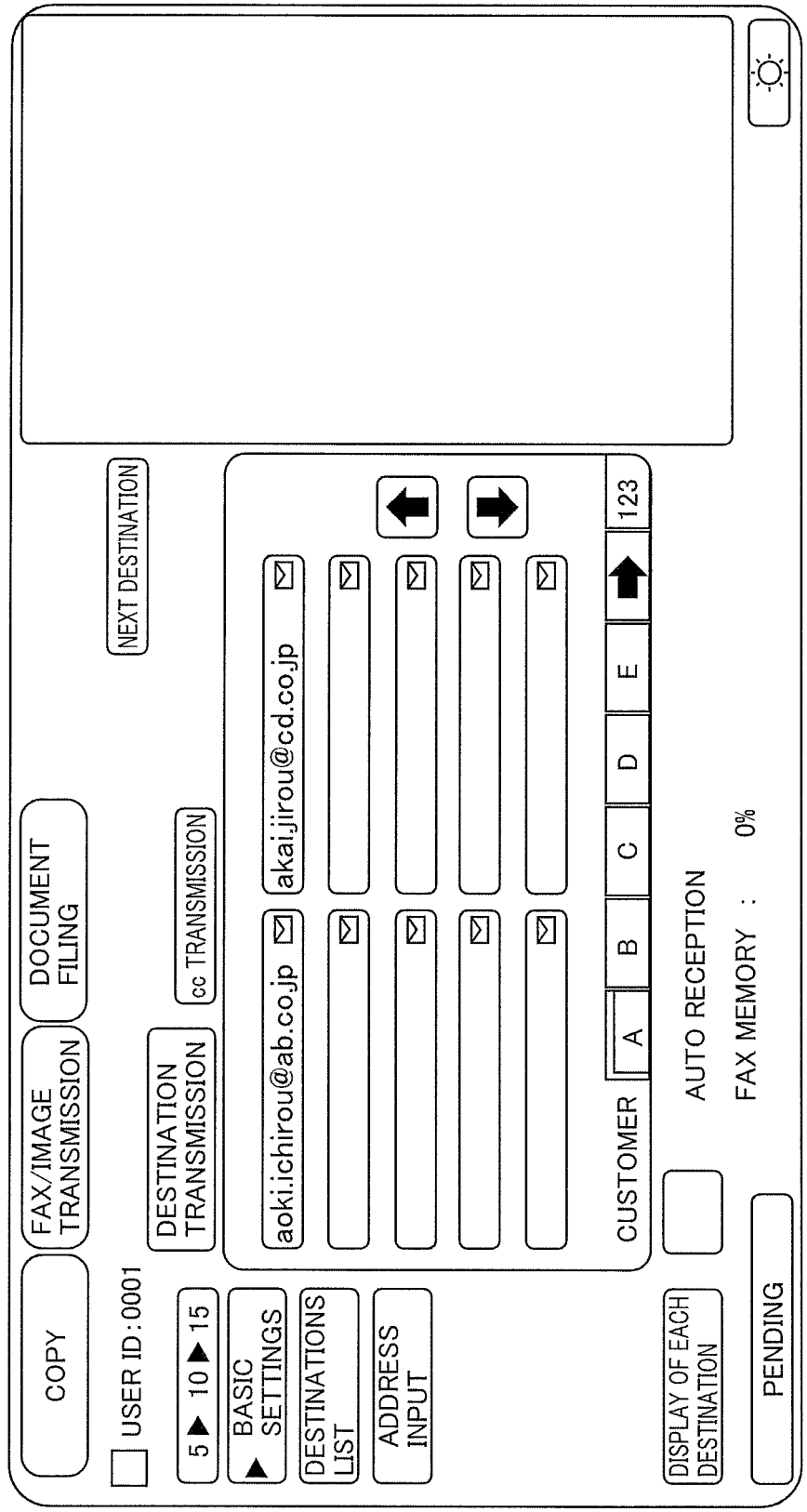
FIGS. 8 to 13 show transitions of images displayed on a touch-panel display when the program of FIG. 7 is executed.

A user (here, user having the ID "0001") logs-in to an MFP 300 to be used (YES at S3200). The user presses a software button corresponding to the fax/image transmission mode displayed at the top of touch-panel display 380 (YES at S3204). An image for designating destinations for fax/image transmission is displayed on touch-panel display 380 (S3206). At this time, destination candidates registered in the address book are displayed in alphabetical order on touch-panel display 380. FIG. 8 shows an example of the image for designating destinations of fax/image transmission displayed on touch-panel display 380. In FIG. 8, destinations starting from "A" of the address book in the alphabetical order are extracted and displayed. Further, though the registered destinations are not shown in FIG. 8, it is possible for the user to designate destinations of multicast transmission by looking up the addresses.

Figure 9:
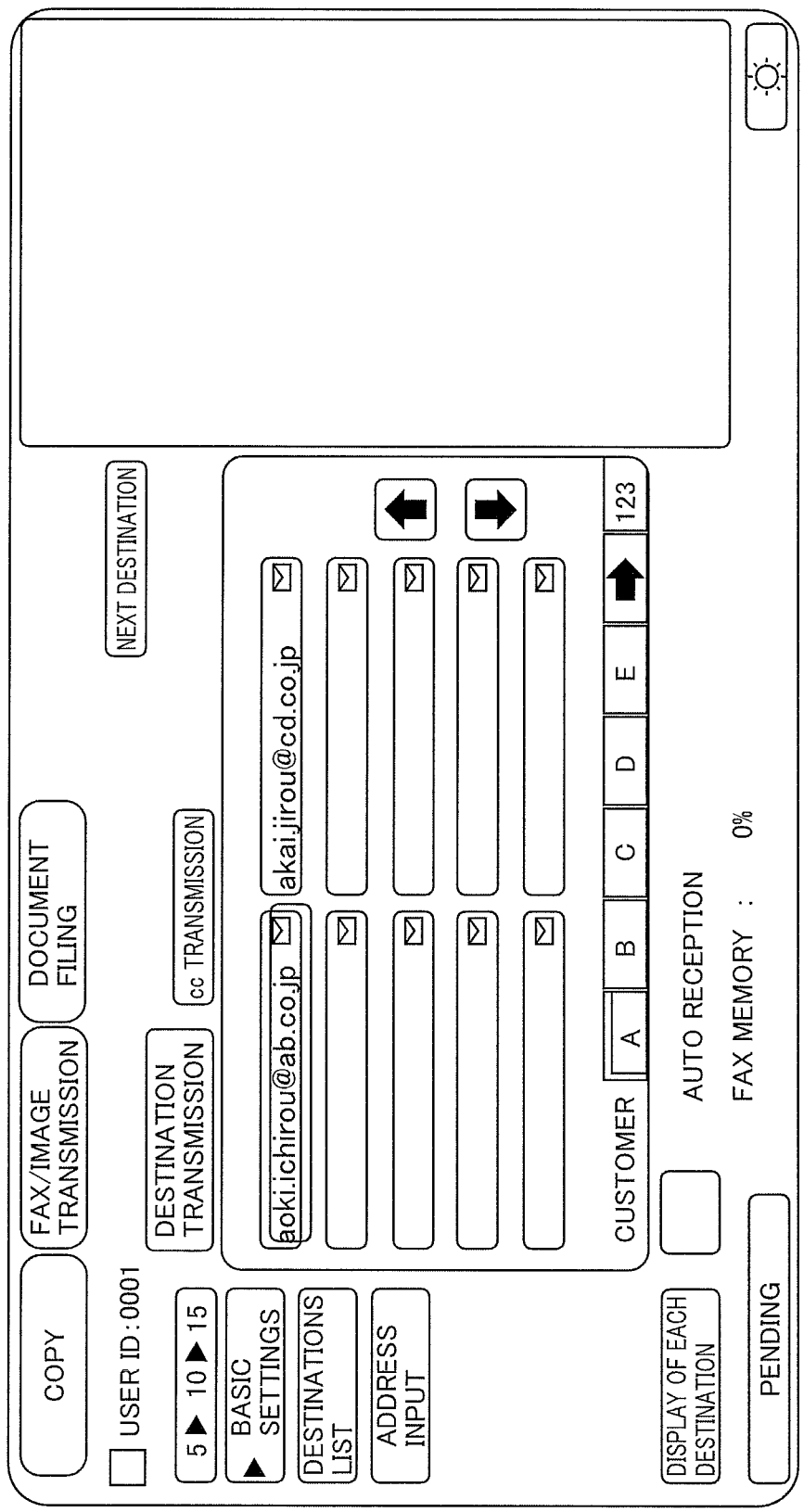

When the user presses a software button corresponding to one of the addresses displayed on touch-panel display 380 to select the first destination of multicast transmission (YES at S3210), the selected destination is emphasized as shown in FIG. 9 (S3212). Here, it is assumed that "aoki.ichirou@ab.co.jp" is selected as the first destination of multicast transmission. The manner of emphasize is not specifically limited, and any manner that can let the user recognize the selected state, such as highlighting or flickering may be utilized. In the figures of the present application, the emphasized state is represented by a double frame. Therefore, in FIG. 9, "aoki.ichirou@ab.co.jp" selected as the first destination of multicast transmission is emphasized by the double frame.

A destination or destinations that have been multicast together with "aoki.ichirou@ab.co.jp" selected as the first destination by the logged-in user (user ID: 0001) are extracted from the multicast transmission destination management table shown in FIG. 4 (S3214). At this time, as shown in FIG. 4, the destinations that have been multicast with "aoki.ichirou@ab.co.jp" in the past are four destinations, that is, "yamada.saburo@sh.co.jp", "suzuki.shirou@sh.co.jp," "sato.gorou@sh.co.jp" and "tanaka.roku@sh.co.jp." Therefore, as shown in FIG. 10, the four addresses are displayed on touch-panel display 380 with a message "SIMULTANEOUS TRANSMISSION WAS MADE TO THE FOLLOWING ADDRESSES." In FIG. 10, "aoki.ichirou@ab.co.jp" selected as the first destination of multicast transmission by the user is emphasized.

Specifically, when "aoki.ichirou@ab.co.jp" is selected as the first destination of multicast transmission using the address book shown in FIG. 8, "aoki.ichirou@ab.co.jp" is emphasized as shown in FIG. 9 (S3212). Further, four destinations "yamada.saburo@sh.co.jp," "suzuki.shirou@sh.co.jp," "sato.gorou@sh.co.jp" and "tanaka.roku@sh.co.jp" are extracted as destinations of multicast transmission with "aoki.ichirou@ab.co.jp" multicast by the user in the past (S3214), and displayed as candidates of multicast transmission destinations as shown in FIG. 10 (S3216).

Figure 10:
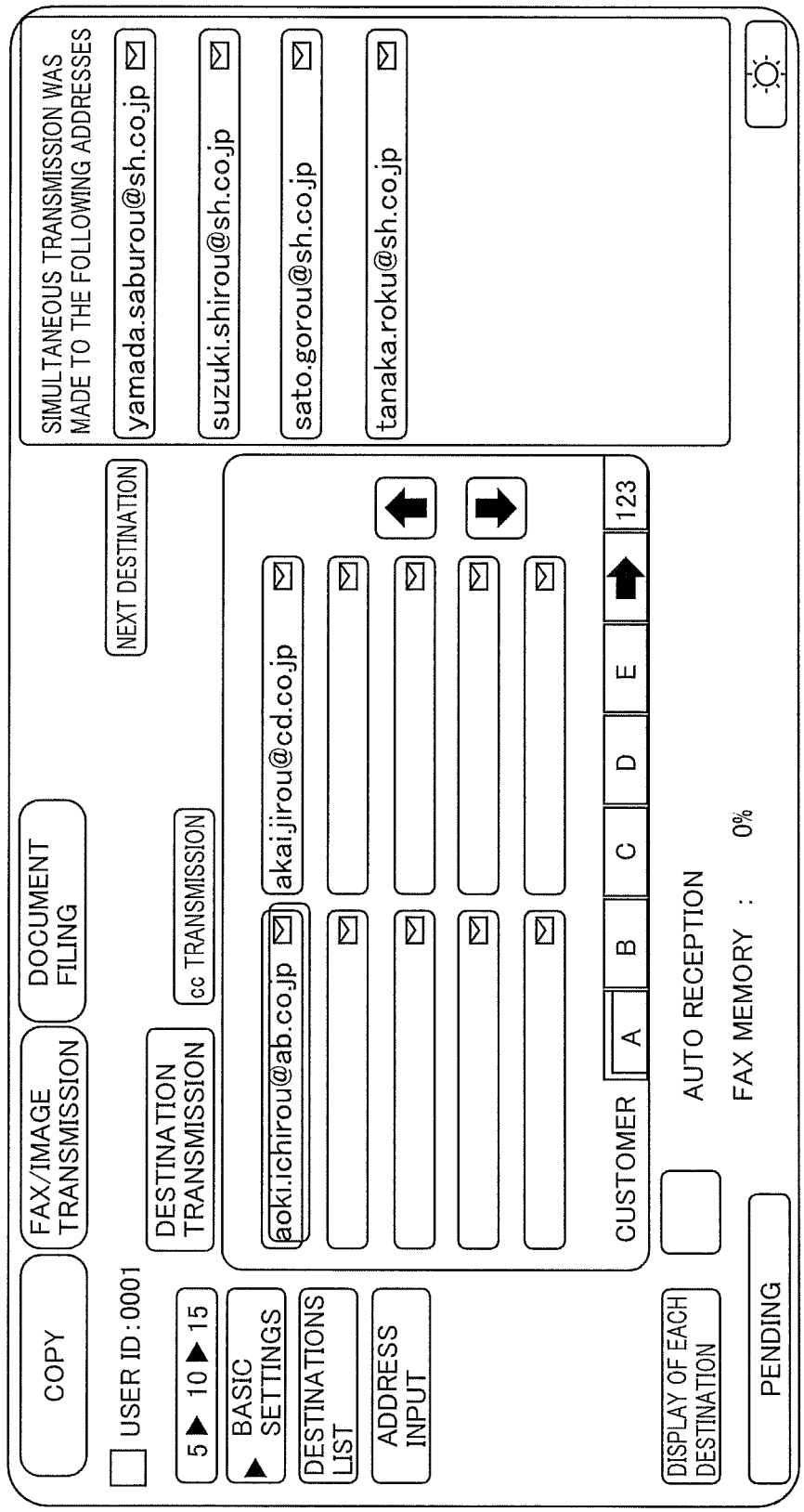
Figure 11:
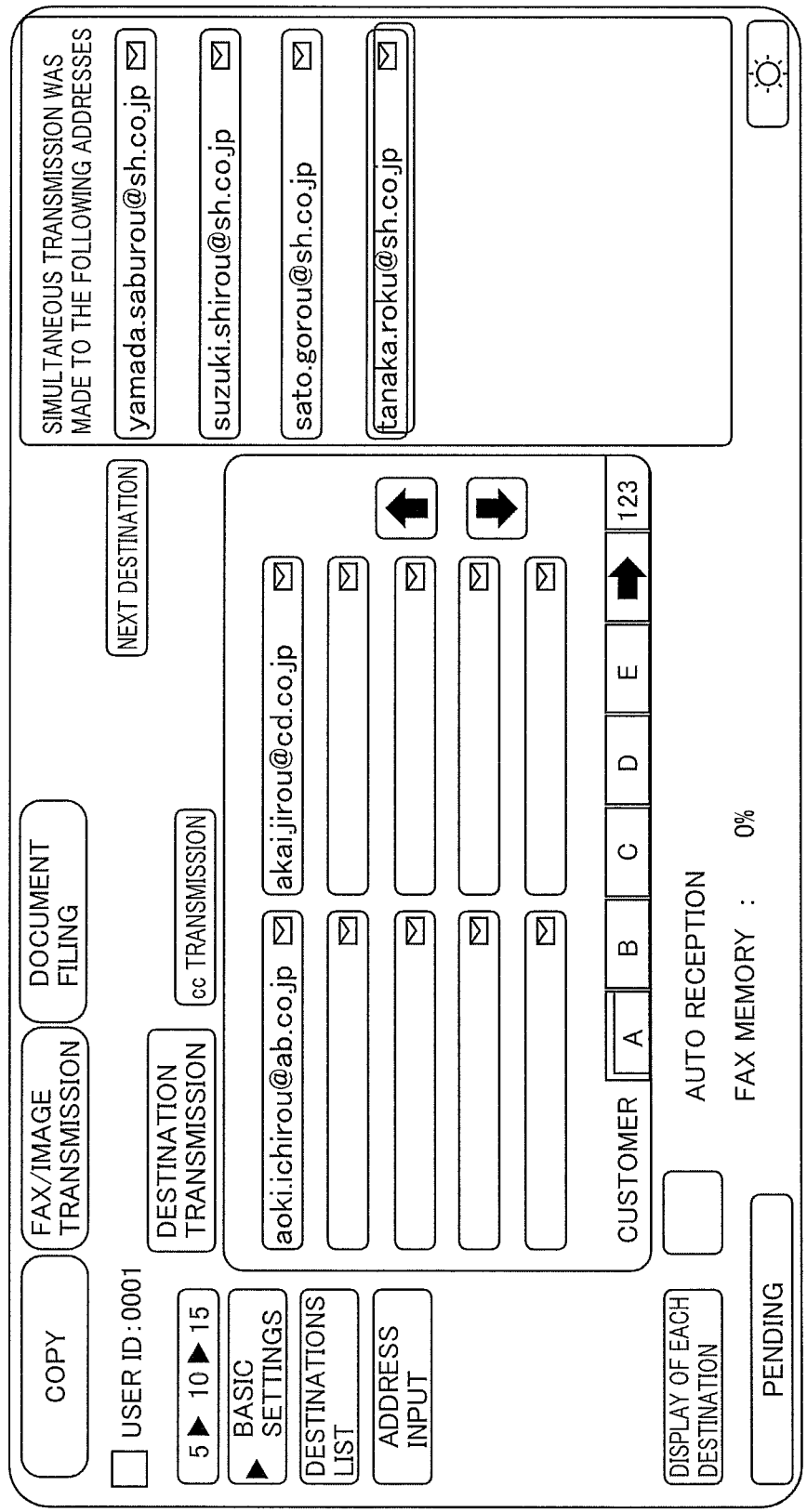
Figure 12:
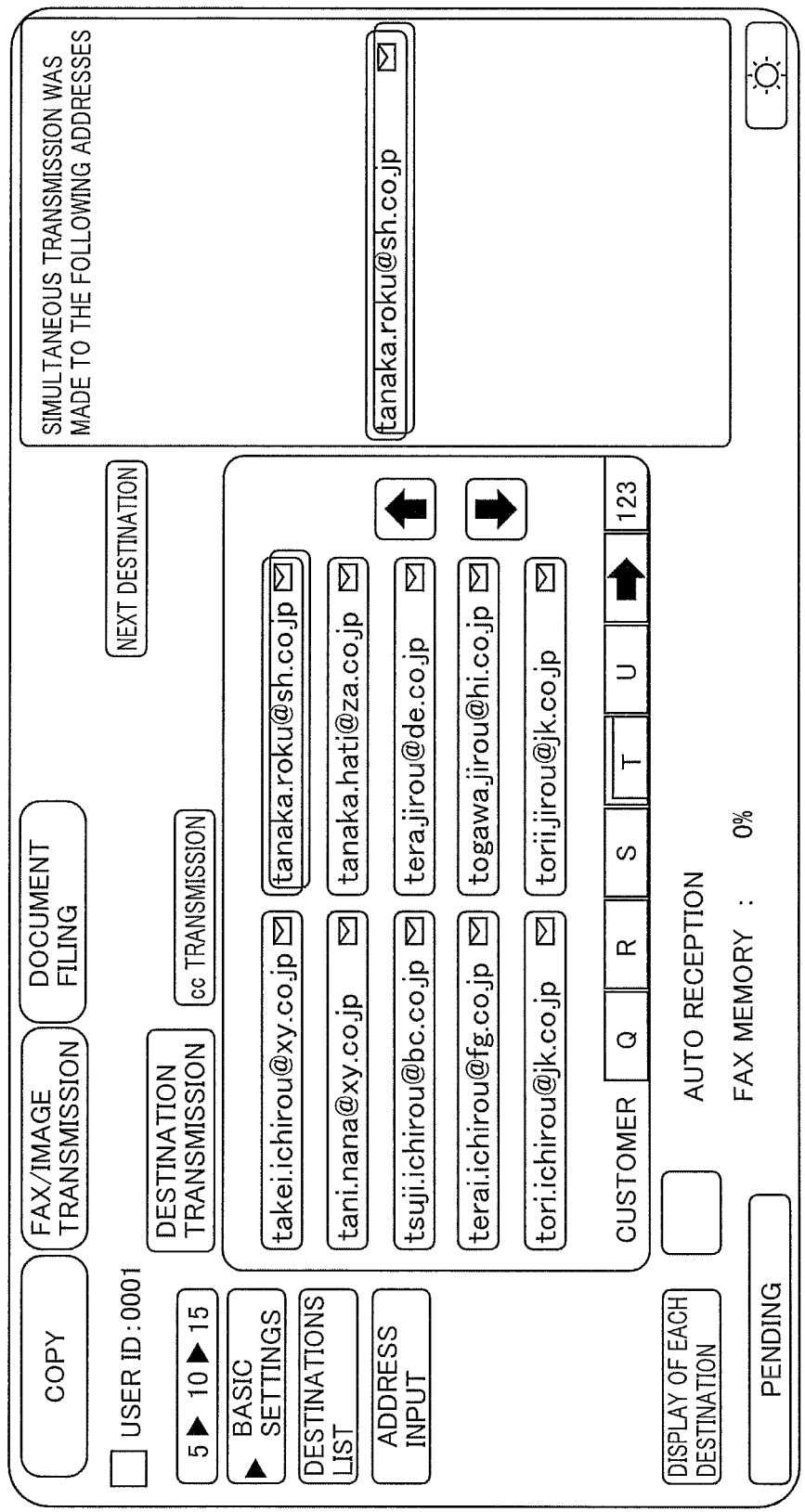

When the user selects "tanaka.roku@sh.co.jp" shown in FIG. 10 as the second destination (YES at S3210), the address is switched to emphasized display as shown in FIG. 11 (S3212). Further, at this time, the image is switched to an address book including the selected "tanaka.roku@sh.co.jp" as shown in FIG. 12. Then, "tanaka.roku@sh.co.jp" is switched to the emphasized display (S3212).

A destination or destinations that have been multicast both with "aoki.ichirou@ab.co.jp" selected as the first destination and "tanaka.roku@sh.co.jp" as the second destination are extracted from the multicast transmission destination management table shown in FIG. 4 (S3214). Here, as shown in FIG. 4, the number of destinations that have been multicast both with "aoki.ichirou@ab.co.jp" and "tanaka.roku@sh.co.jp" is zero. Therefore, addresses that have been displayed on touch-panel display 380 with the message "SIMULTANEOUS TRANSMISSION WAS MADE TO THE FOLLOWING ADDRESSES" are deleted.

Figure 13:
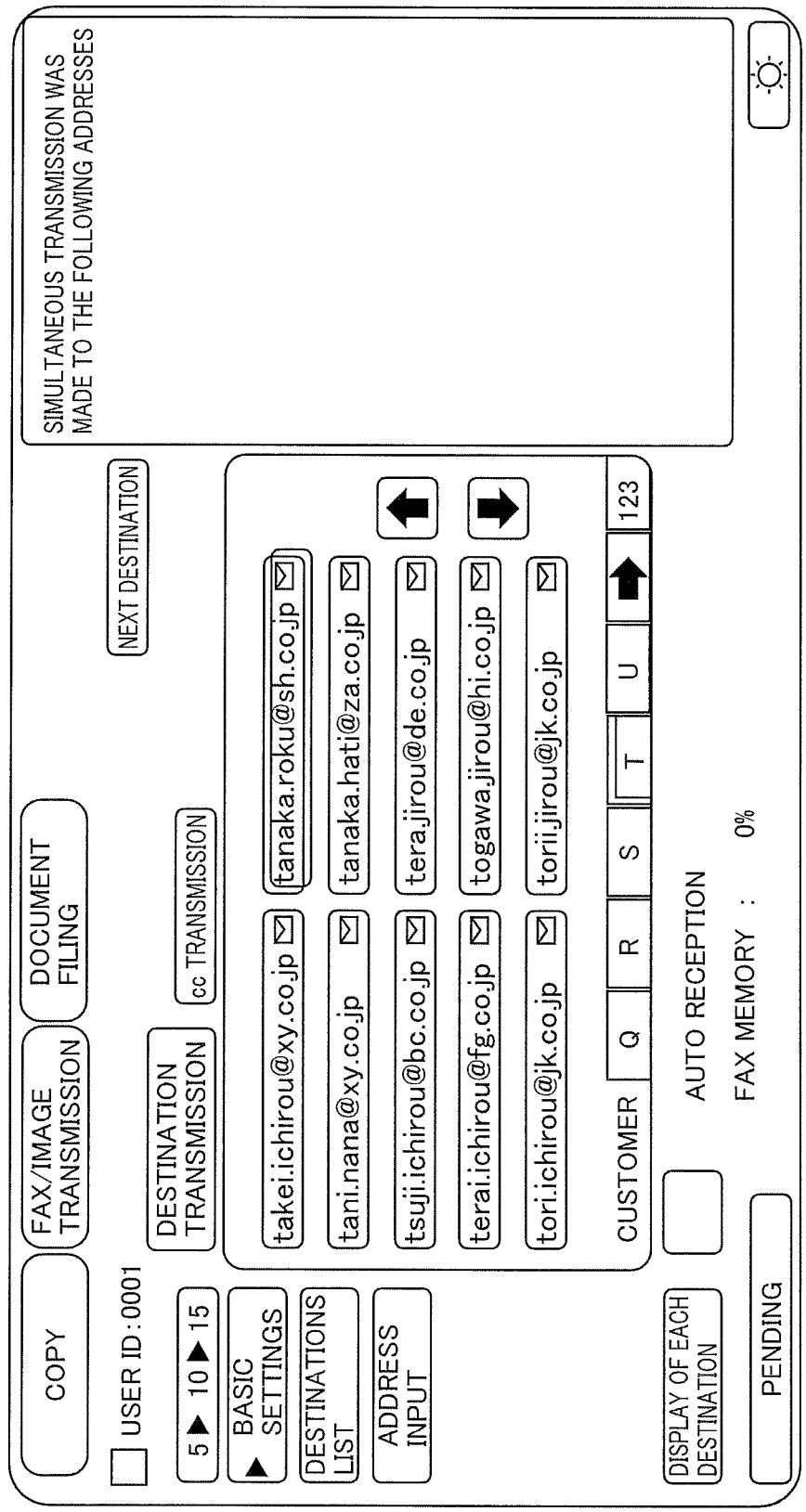

Specifically, as shown in FIG. 10, when "tanaka.roku@sh.co.jp" displayed among the addresses with the message "SIMULTANEOUS TRANSMISSION WAS MADE TO THE FOLLOWING ADDRESSES" is selected as the second destination of multicast transmission, "tanaka.roku@sh.co.jp" is emphasized on the display as shown in FIG. 11 (S3212). Further, the display is switched to a page of the address book including the entry "tanaka.roku@sh.co.jp." Since there is no address stored as designated to be the destination of multicast transmission with "aoki.ichirou@ab.co.jp" and "tanaka.roku@sh.co.jp" in the past, no address is extracted as the destination of past multicast transmission. Therefore, "tanaka.roku@sh.co.jp" is emphasized on display indicating that it is selected as the second destination as shown in FIG. 12, and then, addresses that have been displayed with the message "SIMULTANEOUS TRANSMISSION WAS MADE TO THE FOLLOWING ADDRESSES" are deleted, as shown in FIG. 13.

If the user presses the "transmission destination designation end" button or "transmission destination selection end" button displayed on touch-panel display 380, it is determined that all designations of simultaneous multicast have been selected (YES at S3218), and a list of selected transmission destinations is displayed on touch-panel display 380 (S3220). Confirming multicast transmission to the listed destinations, the user presses the start button provided as a hardware button (YES at S3222). Thus, a transmission request is detected, and multicast transmission process is executed (S3224).

Here, until the "transmission destination designation end" button or "transmission destination selection end" button is pressed, the variable N is incremented one by one, and selection of multicast transmission is repeated.

If no history of multicast transmission including the selected transmission destination among the multicast transmission destinations is stored, there is no address to be displayed with the message "SIMULTANEOUS TRANSMISSION WAS MADE TO THE FOLLOWING ADDRESSES."

Further, when "tanaka.roku@sh.co.jp" is selected in the state of FIG. 11, a list of multicast transmission destinations that has been already selected may be displayed, rather than switching to a page of the address book including "tanaka.roku@sh.co.jp" as shown in FIG. 12. Specifically, in FIG. 12, "tanaka.roku@sh.co.jp" and "aoki.ichirou@ab.co.jp" are displayed on touch-panel display 380, as the list of multicast transmission destinations.

As described above, in the network image forming system in accordance with the present embodiment, it is possible to give useful information related to destinations of multicast transmission to the user who is designating destinations of multicast transmission. Specifically, the server computer manages history of multicast transmission by a plurality of MFPs, and transmits the history to each MFP. In the MFP, when the user designates a destination of multicast transmission, an address or addresses that have been designated as destinations of multicast transmission together with the designated destination are notified. Therefore, while the user is designating (selecting) destinations of multicast transmission, he/she can recognize an address or addresses that have been designated in the past as destinations of multicast transmission with the selected address by the user himself/herself. Thus, destinations of multicast transmission can be set easily without omission.

As described above, the useful information related to the destinations of multicast transmission may be given by a single MFP by itself, or the useful information related to the destinations of multicast transmission may be notified to each of a plurality of MFPs by communication among MFPs, without providing any server computer. In that case, the multicast transmission destination management table (FIG. 4) may be stored in a single MFP, or a multicast transmission destination management table (FIG. 4) common to the plurality of MFPs may be stored through communication between each of the MFPs.

First Modification of the First Embodiment

Figure 14:
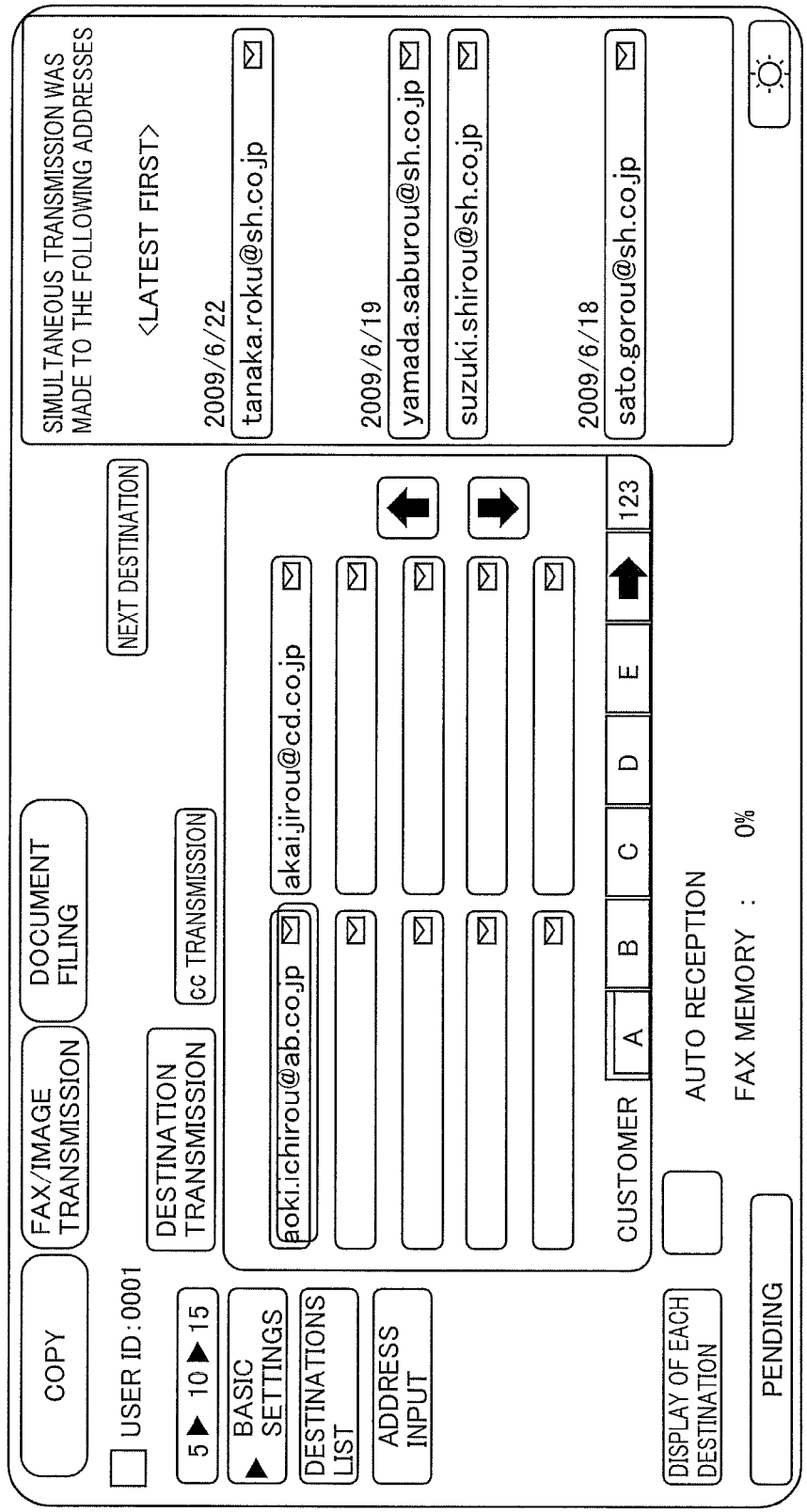
FIGS. 14 to 16 show different examples of the images displayed on the touch-panel display when the program of FIG. 7 is executed.

Referring to FIG. 14, the first modification of the present embodiment will be described. FIG. 14 shows an exemplary image displayed on touch-panel display 380, corresponding to FIG. 10 described above.

As shown in FIG. 14, the four addresses displayed with the message "SIMULTANEOUS TRANSMISSION WAS MADE TO THE FOLLOWING ADDRESSES" are displayed in the order of priority. Here, the four addresses are the same as those shown in FIG. 10, that is, "yamada.saburo@sh.co.jp," "suzuki.shirou@sh.co.jp," "sato.gorou@sh.co.jp" and "tanaka.roku@sh.co.jp."

In the multicast transmission destination management table shown in FIG. 4, the date and time of transmission are stored. For each of the extracted addresses, the latest date and time of transmission are checked. The extracted addresses are sorted in the descending order (latest first), and displayed on touch-panel display 380 in the order of transmission. Specifically, as shown in FIG. 14, the four addresses that have been designated as destinations of multicast transmission together with "aoki.ichirou@ab.co.jp" selected as the first destination are displayed in the descending order of the data and time of last transmission. In the present embodiment, these four addresses are displayed with date and time. If the length in the up/down direction of touch-panel display 380 is too short to show all these addresses, a display allowing scrolling is given.

By this approach, it is possible to give useful information related to the destinations of multicast transmission with priority, to the user who is designating destinations of multicast transmission. Specifically, when the user designates a destination of multicast transmission, addresses that have been designated as destinations of multicast transmission in the past with the designated destination are notified in the order of date and time of transmission in latest-first manner. Therefore, while the user is designating (selecting) destinations of multicast transmission, he/she can know the address or addresses that have been designated as destinations of multicast transmission with the designated destination by the user himself/herself in the past in the order of time of transmission and, therefore, destinations of multicast transmission can be set easily without omission in accordance with the order of transmission starting from the newest.

Second Modification of the First Embodiment

Figure 15:
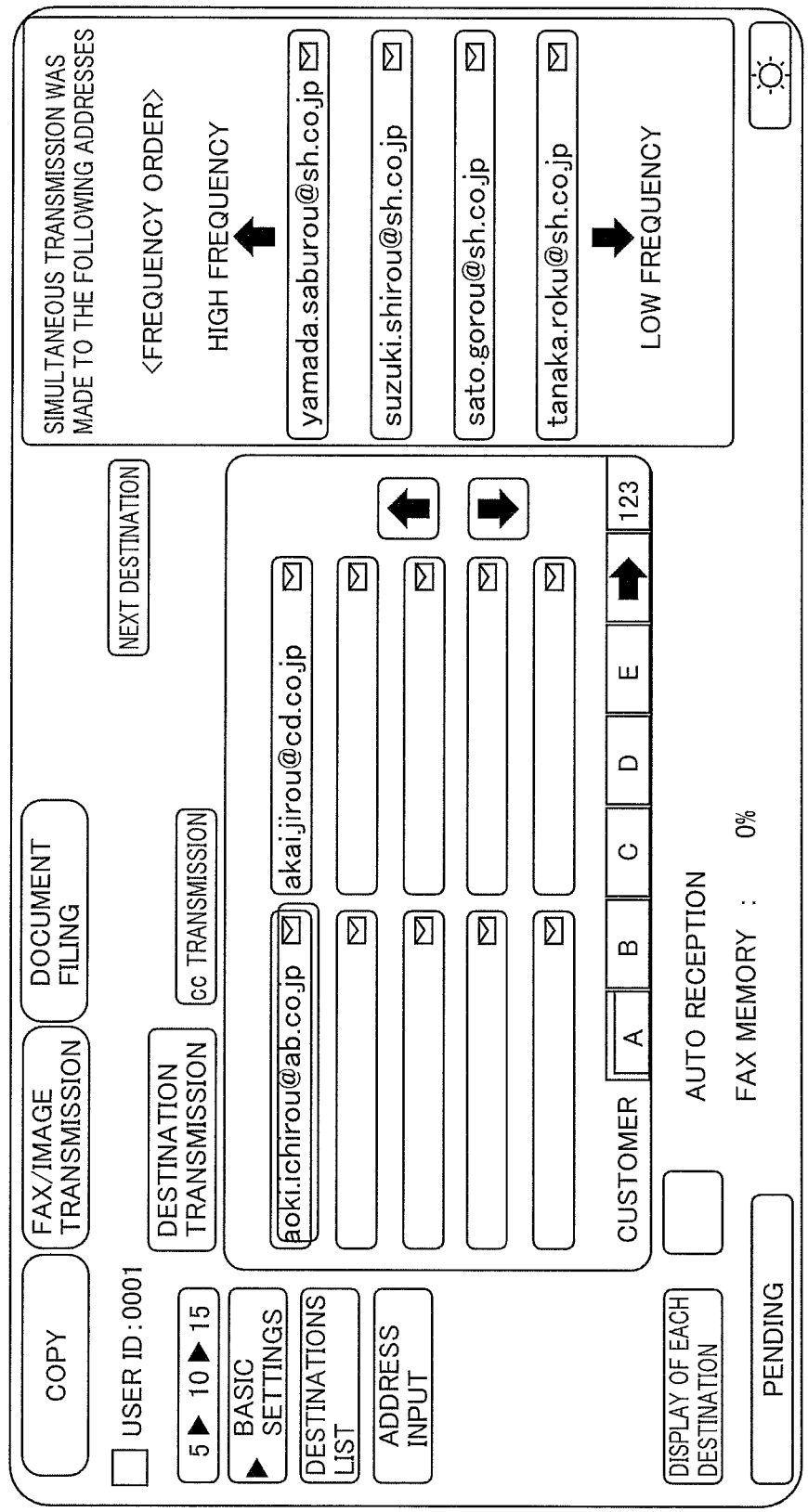

Referring to FIG. 15, the second modification of the present embodiment will be described. FIG. 15 shows an exemplary image displayed on touch-panel display 380 corresponding to FIG. 10 described above.

As shown in FIG. 15, in the present embodiment, the four addresses displayed with the message "SIMULTANEOUS TRANSMISSION WAS MADE TO THE FOLLOWING ADDRESSES" are displayed in the order of frequency of designation as the destinations. As in the example of FIG. 10, the four addresses are "yamada.saburo@sh.co.jp," "suzuki.shirou@sh.co.jp," "sato.gorou@sh.co.jp" and "tanaka.roku@sh.co.jp."

The multicast transmission destination management table shown in FIG. 4 stores multicast transmission one by one. From these multicast transmissions, those having the selected transmission destination address as the transmission destination are extracted. For each of the addresses different from the selected transmission destination address among the transmission destination addresses appearing in the extracted multicast transmissions, frequency of appearance (for example, the number of appearances in a certain time period in the past) is counted. After counting the number of appearances, the extracted addresses are sorted in descending order using the frequency of appearance, and displayed on touch-panel display 380 starting from the one having the highest frequency of transmission (in the order of frequency). Specifically, as shown in FIG. 15, the four addresses that have been selected as destinations of multicast transmission together with "aoki.ichirou@ab.co.jp" selected as the first destination are displayed in the descending order of frequency from the top to the bottom. If the length in the up/down direction of touch-panel display 380 is too short to show all these addresses, a display allowing scrolling is given.

Referring to FIG. 4, using Aoki as a key, it can be seen that four destinations, i.e. Yamada, Suzuki, Sato and Tanaka have been selected as destinations of multicast transmission. More specifically, Yamada has been selected four times, Suzuki three times, Sato two times and Tanaka once, as the destinations of multicast transmission with Aoki. Therefore, "yamada.saburo@sh.co.jp" (Yamada), "suzuki.shirou@sh.co.jp" (Suzuki), "sato.gorou@sh.co.jp" (Sato) and "tanaka.roku@sh.co.jp" (Tanaka) are displayed in this order on touch-panel display 380.

By this approach, it is possible to give useful information related to the destinations of multicast transmission with priority, to the user who is designating destinations of multicast transmission. Specifically, when the user designates a destination of multicast transmission, addresses that have been designated as destinations of multicast transmission in the past with the designated destination are notified in the order of frequency of transmission. Therefore, while the user is designating (selecting) destinations of multicast transmission, he/she can know the address or addresses that have been designated as destinations of multicast transmission with the designated destination by the user himself/herself in the past in the order of frequency and, therefore, destinations of multicast transmission can be set easily without omission in accordance with the order of frequency of multicast transmission.

Third Modification of the First Embodiment

Figure 16:
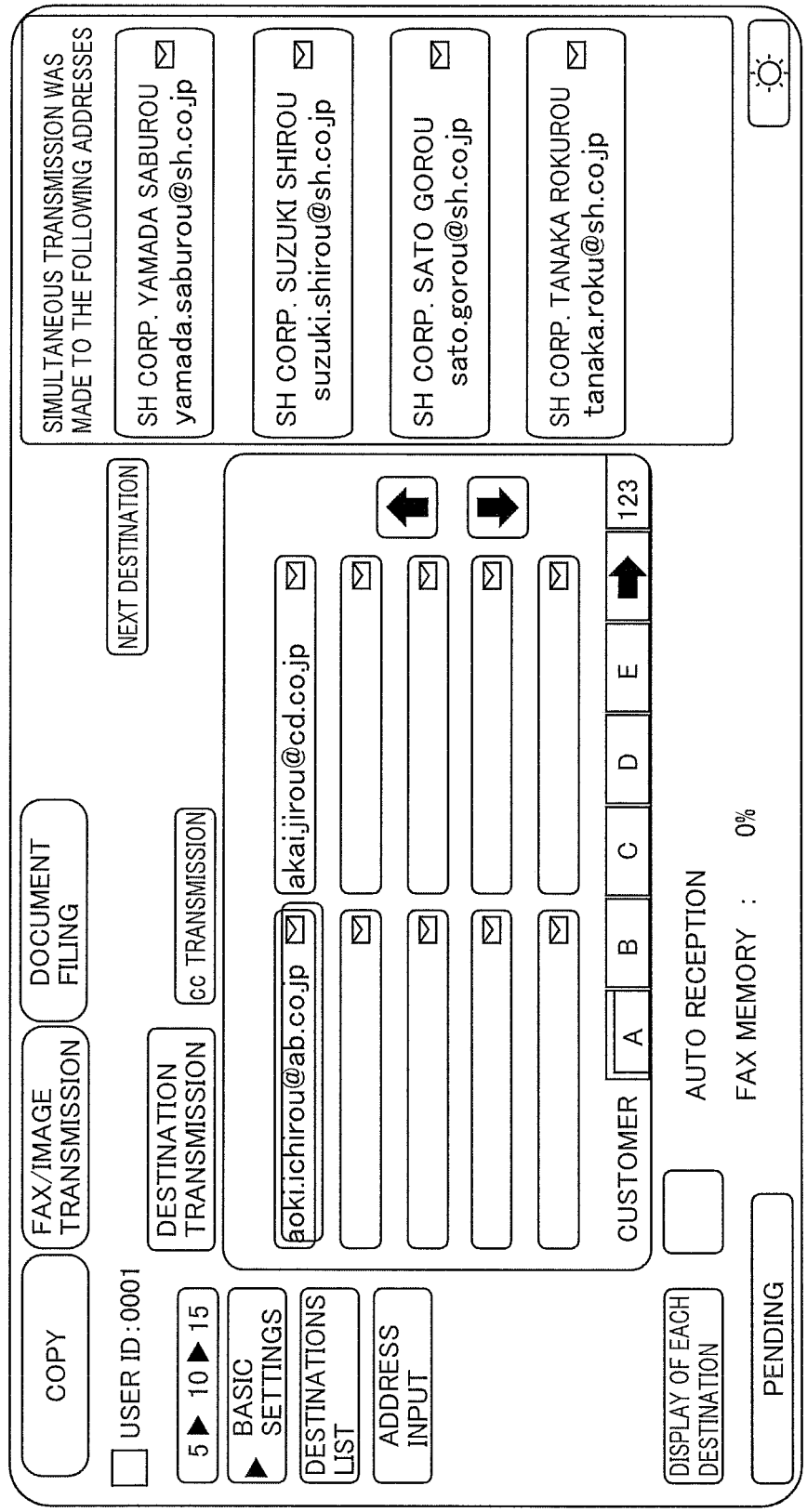

Referring to FIG. 16, the third modification of the present embodiment will be described. FIG. 16 shows an exemplary image displayed on touch-panel display 380 corresponding to FIG. 10 described above.

As shown in FIG. 16, in the present embodiment, the four addresses displayed with the message "SIMULTANEOUS TRANSMISSION WAS MADE TO THE FOLLOWING ADDRESSES" are displayed with registered names. As in the example of FIG. 10, the four addresses are "yamada.saburo@sh.co.jp," "suzuki.shirou@sh.co.jp," "sato.gorou@sh.co.jp" and "tanaka.roku@sh.co.jp."

The registered destination management table shown in FIG. 5 stores addresses and registered names. From the extracted addresses, registered names are read using the registered destination management table, and the names are displayed together with the addresses on touch-panel display 380. Specifically, as shown in FIG. 16, the four addresses that have been selected as destinations of multicast transmission together with "aoki.ichirou@ab.co.jp" selected as the first destination are displayed with the registered names. If the length in the up/down direction of touch-panel display 380 is too short to show all these addresses, a display allowing scrolling is given.

By this approach, it is possible to give useful information related to the destinations of multicast transmission as addresses with registered names, to the user who is designating destinations of multicast transmission. Specifically, when the user designates a destination of multicast transmission, addresses that have been designated as destinations of multicast transmission in the past with the designated destination are notified with their registered names. Therefore, while the user is designating (selecting) destinations of multicast transmission, he/she can know the address or addresses that have been designated as destinations of multicast transmission with the designated destination by the user himself/herself in the past with the registered names and, therefore, destinations of multicast transmission can be set easily without omission by confirming the destinations of multicast transmission using the registered names.

In the present modification, addresses may not be displayed.

Further, the first to third modifications may be appropriately combined for display on touch-panel display 380.

Second Embodiment

In the following, a second embodiment of the present invention will be described.

Server computer 200 and MFP 300 forming the network image forming system in accordance with the present embodiment have the same hardware configurations as server computer 200 and MFP 300 in accordance with the first embodiment described above. Therefore, figures related to the hardware are not newly provided, and the hardware configurations will be described with reference to FIGS. 2 and 3. The server computer and MFP forming the network image forming system in accordance with the present embodiment store management tables and execute programs that are partially different from those used in the first embodiment described above. In the present embodiment, as in the first embodiment, the useful information related to the destinations of multicast transmission may be given by a single MFP by itself, or the useful information related to the destinations of multicast transmission may be notified to each of a plurality of MFPs by communication among MFPs, without providing any server computer.

In the present embodiment, server computer 200 stores a group ID uniquely identifying a group to which a user belongs, in association with the user ID, the multicast transmission destination list of the user is transmitted to the MFP through the network line, and the MFP stores the multicast transmission destination list in the multicast transmission destination management table, together with the group ID. Based on the group-by-group multicast transmission destination list received from the server computer, the MFP displays addresses that have been selected as the destinations of multicast transmission in the past with the destination designated as the destination of multicast transmission in the group to which the logged-in user belong, on the touch-panel display.

In this manner, in the present embodiment, the destinations of multicast transmission often used by the group to which the user logged-in to use the MFP belongs are displayed in correspondence with the destination designated by the user, on the touch-panel display. In the following, the network image forming system operating in this manner will be described.

It is noted that the first embodiment is a specific case of the second embodiment in which each user group consists of only one user. Here, the user and the user group are the same.

[Management Table Configuration]

Referring to FIG. 17, the multicast transmission destination management table stored in HDD 240 of the server computer and in HDD 340 of the MFP will be described. The multicast transmission destination management table stores the history of multicast transmission, indicating what addresses are combined for multicast transmission by the MFP in the group to which the user belongs, based on the multicast transmission destination list transmitted from the MFP.

As shown in FIG. 17, the multicast transmission destination management table includes, in addition to the fields of multicast transmission destination management table shown in FIG. 4, a field for storing group ID for uniquely identifying a group to which the user belongs.

According to the multicast transmission destination management table shown in FIG. 17, the user identified by the user ID of "0001" belongs to the group identified by the group ID "01"; the user of user ID "0002" belongs to the group identified by the group ID "02"; the user of user ID "0003" belongs to the group identified by the group ID "03"; the user of user ID "0004" belongs to the group identified by the group ID "02"; and the user of user ID "0005" belongs to the group identified by the group ID "01".

Here, the group refers to a department of the same or common work assignment, such as "marketing group", "development group" and "accounting group." Since the work assignment is the same or common, it is highly likely that the members of the group multicast to same destinations. Therefore, based not only on the information of multicast transmission to the same destinations by one user but also on the information of multicast transmission to the same destinations by the group to which the user belongs, the useful information related to the destinations of multicast transmission is given to the user who is designating destinations of multicast transmission.

As shown in FIG. 17, the user having the user ID of "0001" belongs to the group of group ID "01", and the multicast transmissions performed are: on "2009/06/16 10:32:15" to "yamada.saburo@sh.co.jp", "aoki.ichirou@ab.co.jp", "suzuki.shirou@sh.co.jp" and "sato.gorou@sh.co.jp" (destinations: Yamada, Aoki, Suzuki, Sato); on "2009/06/17 18:41:11" to "yamada.saburo@sh.co.jp", "aoki.ichirou@ab.co.jp" and "suzuki.shirou@sh.co.jp" (destinations: Yamada, Aoki, Suzuki); on "2009/06/18 08:22:07" to "yamada.saburo@sh.co.jp", "aoki.ichirou@ab.co.jp" and "sato.gorou@sh.co.jp" (destinations: Yamada, Aoki, Sato); on "2009/06/19 10:55:21" to "yamada.saburo@sh.co.jp", "aoki.ichirou@ab.co.jp" and "suzuki.shirou@sh.co.jp" (destinations: Yamada, Aoki, Suzuki); and on "2009/06/22 08:55:25" to "aoki.ichirou@ab.co.jp", "suzuki.shirou@sh.co.jp" and "tanaka.roku@sh.co.jp" (destinations: Aoki, Tanaka).

Further, a user having user ID of "0005" belongs to the same group, and the user performed multicast transmission on "2009/06/17 09:15:28" to "aoki.ichirou@ab.co.jp", "tanaka.roku@sh.co.jp" and "tani.nana@xy.co.jp" (destinations: Aoki, Tanaka, Tani).

Here, using Aoki as a key, it can be seen that four destinations, i.e. Yamada, Suzuki, Sato and Tanaka have been selected as destinations of multicast transmission by the user of user ID "0001" and Tanaka and Tani are the destinations of multicast transmission by the user of user ID "0005". Therefore, using Aoki as a key, it can be seen that five destinations, i.e. Yamada, Suzuki, Sato, Tanaka and Tani have been selected as destinations of multicast transmission by the group of group ID "01" to which these users (user IDs: 0001, 0005) belong.

The database shown in FIG. 17 is an example and the present invention is not limited to such a database. Further, it is assumed that each MFP 300 can read the group ID based on the user ID of the logged-in user.

[Software Configuration]

Figure 18:
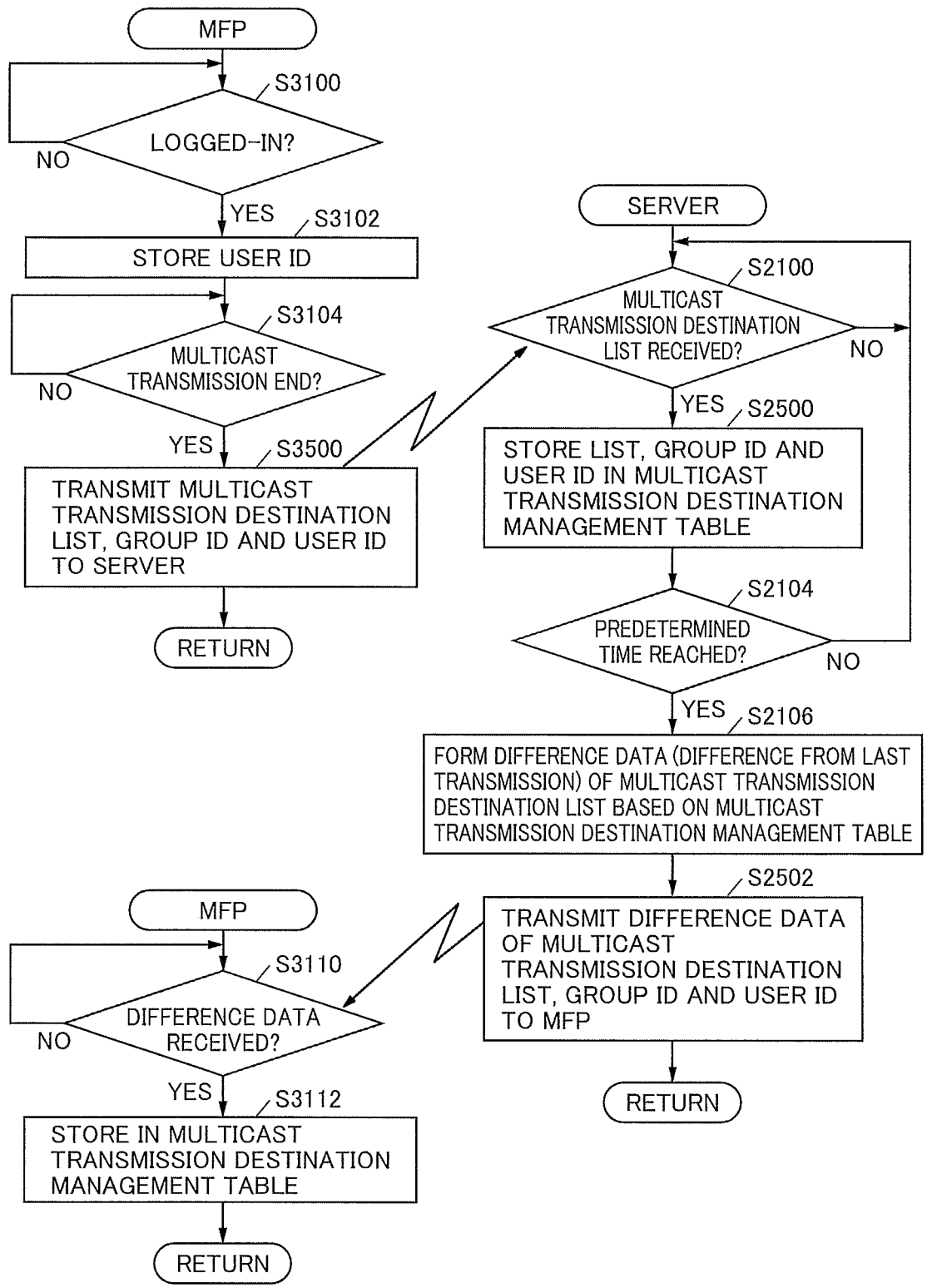
FIG. 18 is a flowchart showing a control structure of a multicast transmission history processing program executed by the server computer and MFP of the network image forming system in accordance with the second embodiment of the present invention.

FIG. 18 is a flowchart representing a control structure of a computer program executed by the server computer and the MFP for performing the process of giving useful information related to destinations of multicast transmission to the user who is designating destinations of multicast transmission. The flowchart corresponds to the flowchart of FIG. 6. The flowchart of FIG. 6 differs from the flowchart of FIG. 18 in that process steps S3106, S2102 and S2108 of FIG. 6 are changed to S3500, S2500 and S2502 in FIG. 18, respectively. Other process steps are the same and denoted by the same step numbers. Detailed description of these steps will not be repeated.

Referring to FIG. 18, at S3500, CPU 310 transmits a list of multicast transmission destinations of a multicast transmission process determined to be completed, as a multicast transmission destination list, to the server computer, together with the group ID and the user ID. At this time, data of transmission date and time is also transmitted to the server computer.

At S2500, CPU 210 stores the multicast transmission destination list received from the MFP in the multicast transmission destination management table shown in FIG. 17, with the group ID and the user ID. As the multicast transmission destination lists are stored in the multicast transmission destination management table, it follows that a large number of multicast transmission destination lists come to be accumulated in the multicast transmission destination management table together with the group IDs and user IDs. Here, in order to avoid excessive storage of data of multicast transmission management table, the data whose date and time of transmission are older than six month, for example, in FIG. 17 may be deleted.

At S2502, CPU 210 transmits the difference data of multicast transmission destination list together with the group ID and the user ID to each MFP. As to the transmission of difference data of multicast transmission destination list to MFP, here, only the change made after the last transmission is transmitted in the form of difference data, to reduce communication traffic.

Figure 19:
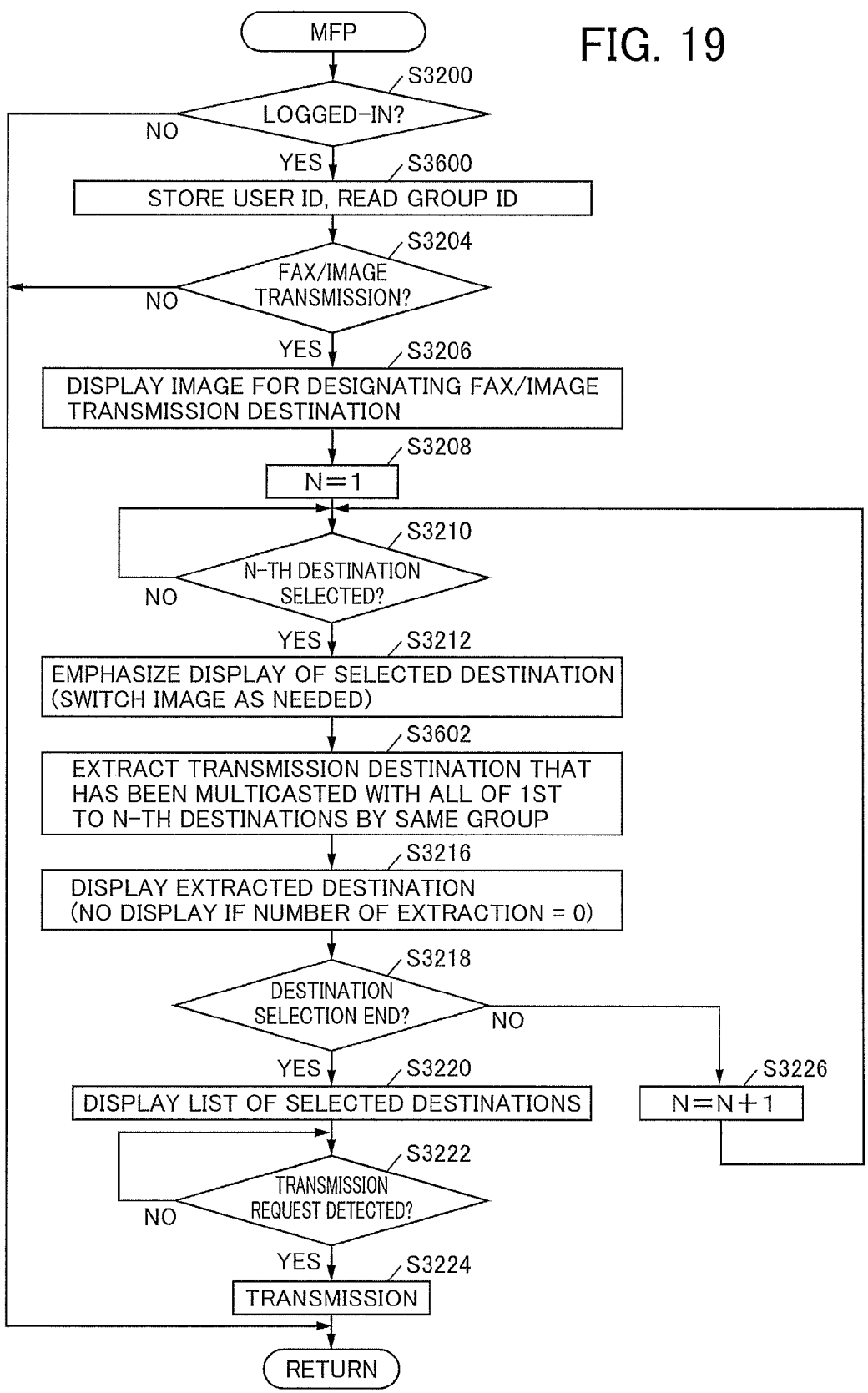
FIG. 19 is a flowchart representing a control structure of a multicast transmission destination designating program executed by the server computer and MFP of the network image forming system in accordance with the second embodiment of the present invention.

Referring to FIG. 19, a control structure of a program executed by the MFP when a user designates destinations of multicast transmission in the network image forming system in accordance with the present embodiment will be described. The flowchart corresponds to the flowchart of FIG. 7. The flowchart of FIG. 7 differs from the flowchart of FIG. 19 in that process steps S3202 and S3214 of FIG. 7 are changed to S3600 and S3602 in FIG. 19, respectively. Other process steps are the same and denoted by the same step numbers. Detailed description of these steps will not be repeated.

Referring to FIG. 19, at S3600, CPU 310 stores a user ID for uniquely identifying a user, registered in correspondence with the input user number or the fingerprint of the user, and reads a group ID corresponding to the user ID.

At S3602, using the multicast transmission destination management table stored in HDD 340 (FIG. 17), CPU 310 extracts any address not yet designated, from among the transmission destinations (destinations) included in the history of multicast transmission that designated all addresses from the first to N-th addresses by the group to which the logged-in user belongs.

[Operation]

The operation of network image forming system in accordance with the present embodiment based on the structures and flowcharts as above will be described in the following.

<Multicast Transmission History Processing Operation>

Referring to the multicast transmission destination management table shown in FIG. 17 and the flowchart shown in FIG. 18, the multicast transmission history processing operation of the network image forming system will be described.

First, the user requests log-in, by inputting a user number or by inputting the fingerprint of the user by scanning, on touch-panel display 380 of MFP 300 to be used. If the user who requested log-in is a user registered in advance to allow use of MFP 300, log-in is permitted (YES at S3100). The user ID is stored in MFP 300 and the group ID to which the user belongs is read (S3102). Thus, the user and the group to which the user belongs can be uniquely identified.

If the user performs the fax/image transmission process by the MFP and the process ends (YES at S3104), the addresses selected by the user as the multicast transmission destinations in the MFP are transmitted as a multicast transmission destination list, together with the group ID, user ID and the date and time of transmission, to server computer 200 (S3500).

In response to such an operation of the MFP, the server computer receives the multicast transmission destination list, together with the user ID, from MFP 300 (YES at S2100). The received multicast transmission destination list is stored, with the group ID and the user ID, in HDD 240 in the form of multicast transmission destination management table shown in FIG. 17 (S2500).

In this embodiment also, user-by-user transmission destination lists collected in the server computer are transmitted to the MFP at a predetermined time. When the predetermined time is reached (YES at S2104), based on the multicast transmission destination lists stored in the multicast transmission destination management table, the difference data (difference from the last transmission) is formed (S2106). The formed difference data is transmitted to MFP 300 (S2108).

In response to such an operation of the server computer, each of the MFPs receives the difference data of multicast transmission destination list with the user ID (YES at S3110). The received difference data of the user-by-user multicast transmission destination list (with the group ID) is stored, added to the multicast transmission destination management table stored in HDD 340 (S3112).

In the server computer, receiving the multicast transmission destination list with group IDs from the MFPs, the multicast transmission destination management table (FIG. 17) is updated on real-time basis. Therefore, user history of multicast transmission destinations are accumulated in the multicast transmission destination management table. In this manner, the user history of multicast transmission are accumulated in the multicast transmission destination management table, while the difference data of multicast transmission destinations is transmitted to MFPs at a preset time interval. The MFP updates the multicast transmission destination management table (with group ID) stored in its HDD 340.

<Multicast Transmission Destination Setting Operation>

Referring to the flowchart shown in FIG. 19 and the exemplary image on touch-panel display 380 shown in FIG. 20, the function setting operation of the network image forming system will be described.

A user (here, user having the ID "0001") logs-in to an MFP 300 to be used (YES at S3200). Then, the group ID corresponding to the user ID is read. The user presses a software button corresponding to the fax/image transmission mode displayed at the top of touch-panel display 380 (YES at S3204). An image for designating destinations for fax/image transmission is displayed on touch-panel display 380 (S3206). At this time, destination candidates registered in the address book are displayed in alphabetical order on touch-panel display 380. As shown in FIG. 20, the user ID and the group ID are displayed on touch-panel display 380.

When the user presses a software button corresponding to one of the addresses displayed on touch-panel display 380 to select the first destination of multicast transmission (YES at S3210), the selected destination is emphasized (S3212). Here, it is assumed that "aoki.ichirou@ab.co.jp" is selected as the first destination of multicast transmission.

A destination or destinations that have been multicast together with "aoki.ichirou@ab.co.jp" selected as the first destination by the group (group ID: 01) to which the logged-in user (user ID: 0001) belongs are extracted from the multicast transmission destination management table shown in FIG. 17 (S3602). At this time, as shown in FIG. 17, the destinations that have been multicast with "aoki.ichirou@ab.co.jp" in the past are five destinations, that is, "yamada.saburo@sh.co.jp," "suzuki.shirou@sh.co.jp," "sato.gorou@sh.co.jp," "tanaka.roku@sh.co.jp" and "tani.nana@xy.co.jp." Therefore, as shown in FIG. 20, the five addresses are displayed on touch-panel display 380 with a message "SIMULTANEOUS TRANSMISSION WAS MADE TO THE FOLLOWING ADDRESSES." In FIG. 20, "aoki.ichirou@ab.co.jp" selected as the first destination of multicast transmission by the user is emphasized.

Figure 20:
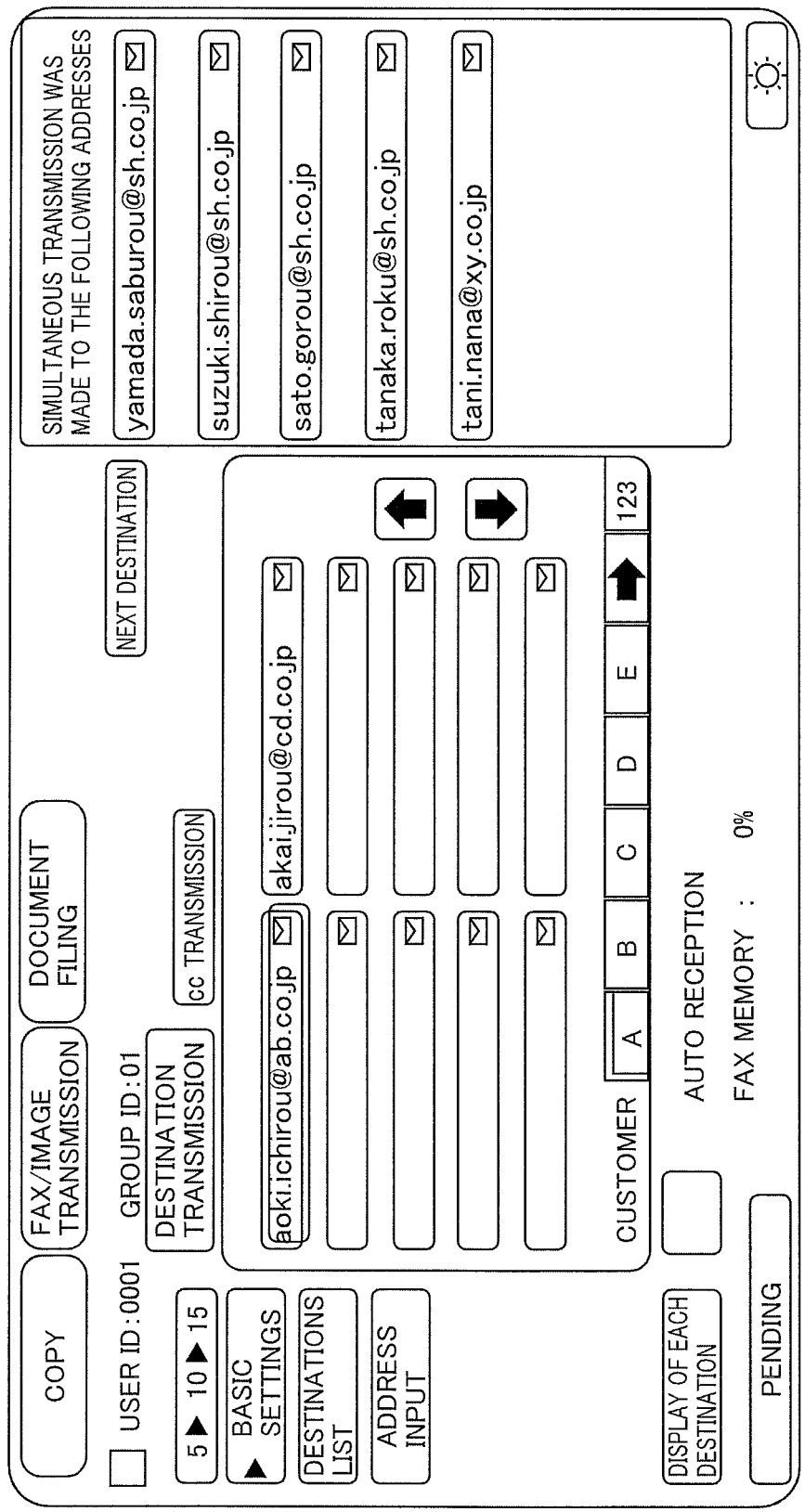
FIG. 20 shows an example of an image displayed on the touch-panel display when the program of FIG. 19 is executed.

Specifically, when "aoki.ichirou@ab.co.jp" is selected as the first destination of multicast transmission, destinations "yamada.saburo@sh.co.jp", "suzuki.shirou@sh.co.jp," "sato.gorou@sh.co.jp," "tanaka.roku@sh.co.jp" and "tani.nana@xy.co.jp" are extracted as destinations of multicast transmission with "aoki.ichirou@ab.co.jp" multicast in the past by the group to which the user belongs (S3602), and displayed as candidates of multicast transmission destinations as shown in FIG. 20 (S3216).

As described above, in the network image forming system in accordance with the present embodiment, it is possible to give useful information related to destinations of multicast transmission to the user who is designating destinations of multicast transmission. Specifically, the server computer manages history of multicast transmission by a plurality of MFPs, and transmits the history to each MFP. In the MFP, when the user designates a destination of multicast transmission, an address or addresses that have been designated in the past as destinations of multicast transmission together with the designated destination by the group to which the user belongs are notified. Therefore, while the user is designating (selecting) destinations of multicast transmission, he/she can recognize an address or addresses that have been designated in the past as destinations of multicast transmission with the selected address by the user himself/herself, as well as an address or addresses that have been designated as destinations of multicast transmission with the selected address by the group to which the user belongs. Thus, destinations of multicast transmission can be set easily without omission.

As described above, the useful information related to the destinations of multicast transmission may be given by a single MFP by itself, or the useful information related to the destinations of multicast transmission may be notified to each of a plurality of MFPs by communication among MFPs, without providing any server computer. In that case, the multicast transmission destination management table (FIG. 17) may be stored in a single MFP, or a multicast transmission destination management table (FIG. 17) common to the plurality of MFPs may be stored through communication between each of the MFPs.

In the second embodiment also, as in the three modifications of the first embodiment and the combinations thereof, the addresses that have been selected as the destinations of multicast transmission with the destination input by a user in the group to which the logged-in user belongs may be displayed on touch-panel display 380.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image communication apparatus capable of multicast transmission of transmitting image data to a plurality of transmission destinations in response to one transmission request, comprising:
 a display device;
 an input device displaying an address input dialogue on said display device, for receiving a user input to designate an address of a transmission destination of multicast transmission; and
 first storage storing a multicast transmission history; wherein
 each records in said multicast transmission history include an address of a destination of multicast transmission;
 said image communication apparatus further comprising:
 an extracting device, connected to said input device and said first storage, responsive to said input device receiving an input of an address of a transmission destination of multicast transmission, for extracting, from said multicast transmission history stored in said first storage, a multicast transmission history record including the address received by said input device as a transmission destination, and extracting only an address different from the address received by said input device, included in the extracted multicast transmission history record, as a candidate of multicast transmission destination; and
 a control device controlling said display device such that said extracted candidate of multicast transmission destination is displayed, in a manner allowing individual selection of each candidate, in said address input dialogue.

2. The image communication apparatus according to claim 1, wherein
 said first storage stores, user group by user group, multicast transmission history by a user belonging to the corresponding user group;
 said image communication apparatus further comprising a user identifying device for identifying a user operating said input device; wherein
 said extracting device includes
 a device, connected to said input device and said first storage, responsive to said input device receiving an input of an address of a transmission destination of multicast transmission, for extracting, using said multicast transmission history stored in said first storage, a multicast transmission history record including the address received by said input device as a transmission destination, from history of multicast transmissions by a user of the user group to which the user identified by said user identifying device belongs, and
 a device extracting an address different from the address received by said input device, included in the multicast transmission record extracted by said device for extracting, as a candidate of multicast transmission destination.

3. The image communication apparatus according to claim 2, wherein said group consists of a single user.

4. The image communication apparatus according to claim 2, wherein
 said input device is capable of receiving a plurality of address inputs; and
 said extracting device includes a device, connected to said input device and said first storage, responsive to said input device receiving an input of an address of a transmission destination of multicast transmission, for extracting, from said multicast transmission history stored in said first storage, a multicast transmission history record including all addresses received by said input device as transmission destinations, and extracting an address different from the address received by said input device, included in the extracted multicast transmission history record, as a candidate of multicast transmission destination.

5. The image communication apparatus according to claim 2, further comprising
    address storage storing an address of a transmission destination; wherein
    said input device includes
    an address selecting device, responsive to a user instruction, for displaying a list of addresses stored in said address storage, and receiving an address selecting input by the user, and
    a candidate selecting device, receiving designation by the user in relation to any of the candidates of multicast transmission destination displayed by said control device, for outputting an address of the designated candidate of multicast transmission destination.

6. The image communication apparatus according to claim 5, wherein said control device deletes, in response to selection of any of the candidates of multicast transmission destination by said candidate selecting device, the selected candidate of multicast transmission destination from said display image.

7. The image communication apparatus according to claim 6, wherein said control device controls said display device such that candidates of multicast transmission destination extracted by said extracting device are displayed in accordance with a prescribed priority.

8. The image communication apparatus according to claim 7, wherein said prescribed priority is the date and time of multicast transmission of latest-first order.

9. The image communication apparatus according to claim 7, wherein said prescribed priority is frequency of multicast transmission of highest-first order.

10. The image communication apparatus according to claim 5, wherein said candidate selecting device emphasizes display of the candidate of multicast transmission destination designated by the user.

11. The image communication apparatus according to claim 2, further comprising
    second storage for storing a name of transmission destination in relation to an address of the transmission destination; wherein
    said control device displays name of the transmission destination of the extracted candidate of multicast transmission destination on said display device.

12. The image communication apparatus according to claim 2, further comprising a history deleting device connected to the first storage, for deleting a transmission history record preceding prescribed date and time from multicast transmission history stored in the first storage, at a predetermined timing.

13. The image communication apparatus according to claim 5, wherein
    said address storage further stores a transmission destination name in relation to an address of a transmission destination; and
    said address selecting device includes a transmission destination selecting device responsive to a user instruction for displaying a list of names of said transmission destinations on said display device, allowing the user to select a name of the transmission destination from the displayed list of names of said transmission destinations, and outputting the corresponding address.

14. The image communication apparatus according to claim 13, wherein said transmission destination selecting device displays the transmission destination name selected by the user in an emphasized manner.

15. In an image communication apparatus transmitting image data, a method of designating a transmission destination of multicast transmission of transmitting image data to a plurality of transmission destinations in response to one transmission request, comprising the steps of:
    receiving a user input designating a transmission destination of multicast transmission;
    storing, in storage, a multicast transmission history of a group to which said user belongs;
    extracting, in response to the user input designating a transmission destination of multicast transmission, a multicast transmission record including only a transmission destination recorded as having been selected as a transmission destination simultaneously with said input transmission destination, from the history of multicast transmissions by a user of the user group to which the user belongs, to be a candidate of multicast transmission destination; and
    displaying said extracted candidate of multicast transmission destination, in a manner allowing individual selection of each candidate, on a display device.

* * * * *